US009769913B2

(12) United States Patent
Urakawa et al.

(10) Patent No.: US 9,769,913 B2
(45) Date of Patent: Sep. 19, 2017

(54) BURST-LASER GENERATOR USING AN OPTICAL RESONATOR

(71) Applicant: INTER-UNIVERSITY RESEARCH INSTITUTE CORPORATION HIGH ENERGY ACCELERATOR RESEARCH ORGANIZATION, Tsukuba-shi, Ibaraki (JP)

(72) Inventors: Junji Urakawa, Tsukuba (JP); Hirotaka Shimizu, Tsukuba (JP)

(73) Assignee: INTER-UNIVERSITY RESEARCH INSTITUTE CORPORATION HIGH ENERGY ACCELERATOR RESEARCH ORGANIZATION, Tsukuba-Shi, Ibaraki (JP)

( * ) Notice: Subject to any disclaimer, the term of this patent is extended or adjusted under 35 U.S.C. 154(b) by 153 days.

(21) Appl. No.: 14/764,823

(22) PCT Filed: Feb. 1, 2013

(86) PCT No.: PCT/JP2013/052961
§ 371 (c)(1),
(2) Date: Jul. 30, 2015

(87) PCT Pub. No.: WO2014/118999
PCT Pub. Date: Aug. 7, 2014

(65) Prior Publication Data
US 2015/0373823 A1  Dec. 24, 2015

(51) Int. Cl.
*H05G 2/00* (2006.01)
*H01S 3/067* (2006.01)
(Continued)

(52) U.S. Cl.
CPC ............ *H05G 2/00* (2013.01); *H01S 3/0085* (2013.01); *H01S 3/06791* (2013.01);
(Continued)

(58) Field of Classification Search
CPC .......... H05G 2/00; H05G 2/008; G01V 5/0069
See application file for complete search history.

(56) References Cited

U.S. PATENT DOCUMENTS

| 4,598,415 A | 7/1986 | Luccio et al. |
| 5,212,711 A | 5/1993 | Harvey et al. |

(Continued)

FOREIGN PATENT DOCUMENTS

| JP | 5-75189 A | 3/1993 |
| JP | 6-318751 A | 11/1994 |

(Continued)

OTHER PUBLICATIONS

Fukuda, Masafumi et al., "Development Status and Future Plan of Laser Undulator Compact X-ray Source (LUCX) in KEK," *J. Particle Accelerator Society of Japan*, vol. 9, No. 3, 2012, pp. 156-164, with English language abstract.

(Continued)

*Primary Examiner* — Hoon Song
(74) *Attorney, Agent, or Firm* — Brinks Gilson & Lione

(57) ABSTRACT

The present invention provides a burst-laser generator using an optical resonator which produces high pulse-strength of burst-laser in order to conduct laser Compton scattering, comprising: a self-oscillation amplifying optical loop-path and an external optical resonator to burst-amplify laser, wherein, laser supplied by an exciting laser source is self-oscillation amplified with the self-oscillation amplifying optical loop-path and further burst-amplified with the external optical resonator.

5 Claims, 15 Drawing Sheets

(51) Int. Cl.
| | | |
|---|---|---|
| *H01S 3/11* | (2006.01) | |
| *H01S 3/00* | (2006.01) | |
| *H01S 3/13* | (2006.01) | |
| *H01S 3/136* | (2006.01) | |
| *H01S 3/10* | (2006.01) | |
| *H01S 3/139* | (2006.01) | |
| *H01S 3/07* | (2006.01) | |

(52) U.S. Cl.
CPC .......... *H01S 3/1109* (2013.01); *H01S 3/0092* (2013.01); *H01S 3/06754* (2013.01); *H01S 3/07* (2013.01); *H01S 3/10092* (2013.01); *H01S 3/1121* (2013.01); *H01S 3/1303* (2013.01); *H01S 3/1305* (2013.01); *H01S 3/136* (2013.01); *H01S 3/1308* (2013.01); *H01S 3/139* (2013.01)

(56) References Cited

U.S. PATENT DOCUMENTS

| | | |
|---|---|---|
| 2006/0222147 A1 | 10/2006 | Filkins et al. |
| 2013/0128906 A1* | 5/2013 | Honda ................ H01S 3/1109 372/28 |

FOREIGN PATENT DOCUMENTS

| | | |
|---|---|---|
| JP | 7-110400 A | 4/1995 |
| JP | 8-503105 A | 4/1996 |
| JP | 10-160915 A | 6/1998 |
| JP | 10-233558 A | 9/1998 |
| JP | 11-211899 A | 8/1999 |
| JP | 2000-191329 A | 7/2000 |
| JP | 2000-244044 A | 9/2000 |
| JP | 2002-141589 A | 5/2002 |
| JP | 2004-356479 A | 12/2004 |
| JP | 2006-30288 A | 2/2006 |
| JP | 2009-16488 A | 1/2009 |
| JP | 2009-190958 A | 8/2009 |
| JP | 2010-150097 A | 7/2010 |
| JP | 2010-155778 A | 7/2010 |
| JP | 2011-34006 A | 2/2011 |
| JP | 2011-166169 A | 8/2011 |
| WO | WO 2005/101925 A2 | 10/2005 |
| WO | WO 2006/104956 A2 | 10/2006 |
| WO | WO 2011/016378 A1 | 2/2011 |
| WO | WO 2011/016379 A1 | 2/2011 |
| WO | WO 2011/041493 A2 | 4/2011 |
| WO | WO 2011/060805 A1 | 5/2011 |
| WO | WO 2012/018034 A1 | 2/2012 |
| WO | WO 2012/031607 A1 | 3/2012 |

OTHER PUBLICATIONS

Harvey, G.T. et al., "Harmonically mode-locked fiber ring laser with an internal Fabry-Perot stabilizer for soliton transmission," Optical Society of America, *Optics Letters*, vol. 18, No. 2, Jan. 15, 1993, pp. 107-109.

Honda, Yosuke et al., "Photon Target using Self-start Build-up Cavity for Laser Compton Sources," *Proceedings of Particle Accelerator Society Meeting 2009*, JAEA, Tokai, Naka-gun, Ibaraki, Japan, 2009, pp. 341-343, with English language abstract.

Okhotnikov, O.G. et al., "Stable single- and dual-wavelength fiber laser mode locked and spectrum shaped by a Fabry-Perot saturable absorber," Optical Society of America, *Optics Letters*, vol. 25, No. 22, Nov. 15, 2000, pp. 1624-1626.

Smith, P.W., "Stabilized, Single-Frequency Output from a Long Laser Cavity," *IEEE Journal of Quantum Electronics*, Sep. 1965, 11, vol. QE-1, No. 8, pp. 343-348.

International Preliminary Report on Patentability in corresponding International Application No. PCT/JP2013/052961, dated May 9, 2014, 4 pages.

International Search Report in corresponding International Application No. PCT/JP2013/052961, dated Jun. 4, 2013, 2 pages.

Bonis, J. et al., "Non-Planar Four-Mirror Optical Cavity for High Intensity Gamma Ray Flux Production by Pulsed Laser Beam Compton Scattering off GeV-Electrons", *Journal of Instrumentation*, Institute of Physics Publishing, vol. 7, No. 1, Jan. 27, 2012, 29 pages.

Jones, R. et al., "Passive Optical Amplifier for Picosecond and Femtosecond Pulses", *Quantum Electronics and Laser Science*, Jun. 2003, 3 pages.

Extended Search Report in corresponding European Application No. 13873499.1, dated Sep. 16, 2016, 11 pages.

\* cited by examiner

BURST-LASER GENERATOR USING AN OPTICAL RESONATOR

This application is a 371 application of PCT/JP2013/052961 having an international filing date of Feb. 1, 2013, the entire content of which is incorporated herein by reference.

TECHNICAL FIELD

The present invention is related to a burst-laser generator using an optical resonator which produces high pulse-strength of burst-laser in order to conduct laser Compton scattering in the optical resonator.

BACKGROUND ART

Recently, R&D of a small-sized X-ray generator utilizing laser Compton scattering has been watched. Here, laser Compton scattering is that radiation rays like X-rays are generated at collision of laser and electron beam. In order to perform laser Compton scattering, it is required to produce very high pulse-strength of laser and high luminance of electron beam. However, the production of high pulse-strength of laser has been very difficult as described below. On the other hand, it has been known that high-luminance of electron beam can be produced by circular-accelerators such as synchrotron and cyclotron. So that, it has been presented the conventional apparatus in which laser oscillators are set in the electron beam loop-path of the circular-accelerators. However, the circular-accelerators are very big, usually several kilometers in peripheral length, so that, the above method has been unsuitable for industrial uses.

Circular-accelerators can generate high-luminance of coherent X-rays in the energy range from several keV to 100 keV. But, such accelerators will be never utilized for industrial usages due to their huge size. However, small-sized alternatives to produce X-rays as strong as synchrotron X-rays have been scarcely known.

To generate laser, fiber laser amplifiers and optical resonators have been known. Generation of laser by means of the fiber laser amplifiers is principally based on the induced emission which is usually conducted by irradiation of exciting laser onto the optical fibers doped with induced emission materials, so that, the more fiber becomes long, the more laser becomes strong. However, it is difficult to strengthen laser because oscillation state is easily disappeared due to thermal expansion of optical fibers.

Patent Literature 1 discloses the multi-fiber laser amplifier in which transmission of pumping energy is blocked by an attenuator (optical isolator) inserted between parallel pumping step and backward pumping step. However, this type of fiber laser cannot much raise laser strength due to thermal expansion of optical fiber.

Patent Literature 2 and Non-Patent Literatures 1 and 2 disclose the higher harmonic wave mode-lock fiber laser oscillator which comprises an optical loop consisting of fiber laser amplifier, GHz-driving-$LiNbO_3$-modulator, Fabry-Perot filter, band pass filter and Mach-Zehnder optical modulator, and the like, and the recovery mode-lock fiber laser oscillator which comprises an branching optical loop including photo-coupler, RF power amplifier and Mach-Zehnder optical modulator, and the like, for the purpose of optical communication laser oscillator. Modern times, small-sized fiber laser oscillator (10 dB, 10 times amp.) with ca.10 m-long fiver and large-sized fiber laser oscillator (40 dB, 10,000 times amp.) with ca.10,000 m-long fiber which are similar to the above ring-fiber oscillator are commercially available for the purpose of optical communication laser oscillation. Such long ring-fiver oscillators are easily lost oscillation state due to thermal expansion. The above higher harmonic wave mode-lock fiber laser oscillator and recovery mode-lock fiber laser oscillator disclosed by Patent Literature 2 and Non-Patent Literatures 1 and 2 have been invented to adjust deviance between fundamental frequency and modulated frequency due to thermal expansion. However, pulse-strength of laser generated by the oscillators was only several pico-joules ($10^{-12}$ joules) as described in Non-Patent Literature 2. From this, it will be noted that the hitherto-known fiber laser oscillators are for the purpose of increasing transmission rate of communication signals but not for the purpose of generating high-strength of laser.

On the other hand, an optical resonator has been known as a tool to amplify laser. Laser-amplification by the optical resonator is made by laser interference on the resonator mirror surfaces, so that, the amplification depends on reflectance of the resonant mirrors. As the optical resonators, Fabry-Perot ring-resonator, Michelson interferometer-typed resonator and Fox-Smith interferometer-typed resonator, etc. have been known.

Laser-amplification only occurs under the condition that a resonator length is equal to an integral multiple of a half wave-length of laser. This is so-called a stationary wave standing. The resonance width of a stationary wave is determined by reflectance of resonator mirrors. When intend to obtain high gains, the more the reflectance of mirrors becomes high, the more the resonance width becomes narrow. For example, when suppose a resonator for obtaining 1000 times in gain using a mirror with a reflectance of 99.9%, the resonance width is to be 24 kHz or about 1 Å in resonance position. Consequently the resonance state must be easily disappeared by environmental disturbance of thermal expansion and vibrations. In order to maintain the resonance state, extremely precise feedback-regulations using piezoelectric driving of the resonator mirrors is required, so that, laser-amplification of the conventional optical resonators is limited to about 1000 times due to limitations of mechanical regulations.

Many laser-amplifying apparatuses using optical resonators have been presented (Patent Literatures 3-7 and Non-Patent Literature 3).

Non-Patent Literature 3 discloses the optical resonator to generate single-frequency laser pulses using the Fox-Smith interferometer-typed optical resonators embedding concave mirrors and piezoelectric device for mechanically controlling resonant mirrors. The laser powers generated by this method have been reported to be at most 15 mW.

Patent Literature 3 discloses the simple-structured laser oscillators for encoding electrical signals onto optical beams in which the Fabry-Perot resonators having laser cavities filled with rare-earth doped optical fibers for optical communication and the Fox-Smith interferometer-typed optical resonators having reflecting mirrors. The purpose of these laser oscillators is to provide fine optical conveying waves with longitudinal mode selections but not to generate lasers having high pulse strength. The pulse strength of this typed laser oscillators was at most to micro joule levels due to declination in oscillation width by thermal vibrations, even if raising oscillation powers.

Patent Literature 4 discloses the optical resonator to generate laser light by irradiating pumping-light (exciting laser) onto solid-state lasers, wherein the pumping light is generated by injecting currents into the laser diode or solid-state laser (induced emission medium) which is embedded in the inside of the resonator. This method is a convenient generation method using inexpensive and small-sized laser diodes, however, cannot generate laser light to conduct laser Compton scattering, because of low amplification as explained above.

Patent Literature 5 discloses the laser amplifier to pump lasers using diodes. This amplifier is an apparatus to focalize laser beams into the medium by thermal lens which are put in the inside of the resonator, wherein the resonator is embedding a laser-active-solid-state medium. However, this method cannot generate laser beam to conduct laser Compton scattering, because of low amplification as explained above.

Patent Literature 6 discloses the apparatus to generate laser light using a giant mode-locked laser oscillator and optical resonator. But the giant mode-locked laser oscillator is a very expensive huge apparatus, requires extremely high level of feedback regulations, and is limited to at most 1000 times in gain, therefore, the pulse strength of the laser light generable by this method is at most 100 µJ.

Patent Literature 7 discloses the multistage amplification-typed laser system having multiple resonators placed in series for the purpose of semiconductor exposure. This typed optical resonator is the one to raise gradually the amplification of laser light by subsequent transmission of laser light. The amplification of laser light is limited by mechanical regulative accuracies of resonance width. Even if the system is intended to raise the laser amplification up to the gains enough for laser Compton scattering, the apparatus requires many resonators interconnected in series and each optical resonator requires extremely high level of regulation systems of resonance width. Therefore, it is in need impossible to use such a multistage laser system having multiple resonators placed in series for the purpose of laser source for laser Compton scattering.

The generation of great strength of laser is in principle possible by the combination of a giant exciting laser source and giant RF-oscillator to produce great powers, however, such a giant combination system is unsuitable for industrial usages.

The conventional optical resonators as described above are able to produce laser with low amplification but cannot generate polarized laser.

Several apparatuses to generate Compton scattering X-rays have been presented (Patent Literatures 8-10).

Patent Literature 8 discloses the apparatus to generate X-rays by collision between laser and electron beam in the inside of the Fox-Smith interferometer-typed resonator having a laser oscillator between a pair of mirrors which is set in the electron beam loop-path of the circular-accelerators. Because laser is provided only by the laser oscillator, the amplification of the laser beam supplied by the laser oscillator is limited to at most 1000 times in gain as explained above, even if reflectance of the reflecting mirrors is much raised. Therefore, it is difficult to generate strong Compton scattering X-rays by this apparatus.

Patent Literature 9 discloses the apparatus to generate short-wavelength light by collision between mode-locked laser and electron beam in the inside of the optical resonator providing a unit of multi concave mirrors arranged with a pair of concave mirrors in series, wherein the laser beam is in repetition reflected and focused between the concave mirrors and the collision of the laser and electron beam is carried out in the focused region of the laser beam. Because this apparatus in which the mode-locked laser is merely repeat-reflected between a pair of concave mirrors is, in structure, the same as the Fox-Smith interferometer-typed optical resonator, the amplification of the laser produced by this apparatus is limited to at most 1000 times in gain as described above. Therefore, this apparatus may generate short-wavelength light for a photolithography usage, but cannot generate strong laser Compton scattering X-rays.

Patent Literature 10 discloses the apparatus to generate X-rays or γ-rays by collision between laser and electron beam in the inside of the Fox-Smith interferometer-typed optical resonator providing a pair of mirrors with super reflectance which is set in the electron beam loop-path of the circular-accelerators. Also, the invention discloses the apparatus providing a set of the resonators aligning in parallel on the electron beam orbit. However, the optical resonator used in this apparatus is the conventional resonator providing a pair of concave mirrors. Even if the mirrors with 99.99984% in reflectance can be used, the amplification of laser beam is limited at most 1000 times as explained above. Therefore, this apparatus cannot generate strong laser Compton scattering X-rays.

For the purpose of the development of optical resonators to generate laser with 1 mJ or greater in pulse strength, the development of laser-resistant resonant mirrors might be challenged. It has been known the synthetic optical quartz glass for a semiconductor exposure usage (Patent Literature 11), the highly purified silica glass material with low refraction index (Patent Literature 12), the synthetic quartz glass (Patent Literature 13), the optical quartz glass for a excimer laser usage (Patent Literature 14), the laminated metal coat for a excimer laser usage (Patent Literature 15), the dielectric multi coat consisting of high-refraction tantalum oxide thin layers and low-refraction silica thin layers (Patent Literature 16) and the ceramic materials such as sapphire (Patent Literature 17), etc. In addition, it has been that the reflecting mirrors deposited with multilayer structures containing diamond layers having high thermal conductivities can be used for optical devices such as semiconductor lasers (Patent Literature 18).

However, the present inventors noticed that most of the above resonant mirrors and reflecting mirrors were broken by exposure of laser light with 300 µJ in pulse strength.

In view of the above described circumstances, the present inventors have found that outstanding laser amplification exceeding 3,000 times is achieved by self-oscillation of the optical loop-path which is formed by loop-connecting an optical resonator and fiber laser amplifier with an adjusting cable (Non-Patent Literature 4), and based on this finding have invented an innovative laser oscillator (Patent Literature 19). Using our laser oscillator, it has been possible to generate pulse laser with pulse strength of 300 µJ or more. From this, we considered that the problem of laser amplification has been no longer remained. But, after that, we noted that our laser oscillator was difficult to produce laser with pulse strength of 1 mJ or more due to saturation in amplification.

As described above, most of the laser amplifiers such as optical resonators and fiber laser oscillators have been used for optical communication and laser processing, but small-sized laser generators to produce laser which is strong enough to radiate laser Compton scattering X-rays has been scarcely known.

CITATION LIST

Patent Literature

[Patent Literature 1] JP-B-1996-503105
[Patent Literature 2] JP-A-2000-244044

[Patent Literature 3] JP-A-1994-318751
[Patent Literature 4] JP-A-2002-141589
[Patent Literature 5] JP-A-1993-75189
[Patent Literature 6] JP-A-2009-16488
[Patent Literature 7] JP-A-2011-166169
[Patent Literature 8] U.S. Pat. No. 4,598,415
[Patent Literature 9] JP-A-1995-110400
[Patent Literature 10] JP-A-1999-211899
[Patent Literature 11] JP-A-2010-150097
[Patent Literature 12] JP-A-2010-155778
[Patent Literature 13] JP-A-2009-190958
[Patent Literature 14] JP-A-2000-191329
[Patent Literature 15] JP-A-1998-160915
[Patent Literature 16] JP-A-2006-30288
[Patent Literature 17] JP-A-2004-356479
[Patent Literature 18] JP-A-1998-233558
[Patent Literature 19] JP-A-2011-34006

Non-Patent Literature

[Non-Patent Literature 1] G. T. Harvey, L. F. Mollenauer, Harmonically mode-locked fiber ring laser with an internal Fabry-Perot stabilizer for solution transm, OPTICS LETTERS, 1993, Jan. 15, Vol. 18, No. 2, pp. 107-109

[Non-Patent Literature 2] O. G. Okhotnikov and M. Guina, Stable-single- and dual-wavelength fiber laser mode locked and spectrum shaped by a Fabry-Perot satturable absorber, OPTICS LETTERS, 2000, Nov. 15, Vol. 25, No. 22, pp. 1624-1626

[Non-Patent Literature 3] P. W. Smith, Stabilized single-frequency output from a long laser cavity, IEEE Journal of Quantum Electronics, 1965, 11, Vol. QE-1, No. 8, pp. 343-348.

[Non-Patent Literature 4] Yosuke Honda, et. al., Photon Target using Self-start Bulid-up Cavity for laser Compton source, Proceedings of Particle Accelerator Society Meeting 2009, JAEA, Tokai, Naka-gun, Ibaraki, Japan

SUMMARY OF THE INVENTION

Technical Problem

As described above, the conventional laser Compton scattering apparatus has been presented based on the idea using large circular-accelerators as the electron beam source, so that, the conventional laser Compton scattering apparatus has not been utilized for industrial uses. The present inventors have changed tracks and now present the present invention on the basis of a new idea to conduct laser Compton scattering in an optical resonator using electron beam supplied by an extremely small-sized linear accelerator. Because electron beams produced by the linear accelerators are uncirculated, an optical resonator has to combine a vessel to conduct laser Compton scattering. An object of the present invention is, in view of the above described circumstances, to provide a new laser generator using an optical resonator which is able to produce high strength of burst-laser so as to conduct collision of laser and electron beam (laser Compton scattering) in the inside of the resonator.

Solution to Problem

The present inventors are estimating that pulse-strength of 100 µJ or less is required for generation of usual quasi-monochromatic X-rays through laser Compton scattering, however, pulse-strength of 1 mJ or more is required for generation of high-luminance quasi-monochromatic X-rays which are useful for many industrial applications such as medical diagnostic, medical treatment, material structural analysis and material analysis. Also, the present inventors are estimating that high luminance of electron beam with small normalized-emittance of 10 µm-rad or less is required for the generation of high-luminance quasi-monochromatic X-rays useful for medical diagnostic and medical treatment.

As the results of extensive studies to achieve the above described object, the present inventors have furthermore developed our technology to self-oscillation amplify laser with an optical loop-path connecting an optical resonator and fiber laser amplifier, and have found that a system connecting an external optical resonator to burst amplify laser and the self-oscillation amplifying optical loop-path is able to amplify laser with surprisingly great magnification as far exceeding the limitation of the self-oscillation magnification, and have achieved the present invention based on this finding.

That is, the present invention is:

1. A burst-laser generator using an optical resonator which produces high pulse-strength of laser to conduct laser Compton scattering, comprising: a self-oscillation amplifying optical loop-path which is formed with connecting at least an optical resonator, fiber laser amplifier, RF amplitude-modulator and exciting laser source with an adjusting cable; an external optical resonator to burst-amplify laser which is connected with the optical resonator in the self-oscillation amplifying optical loop-path; wherein, exciting laser supplied by the exciting laser source is self-oscillation amplified as circling on the self-oscillation amplifying optical loop-path and a portion of the self-oscillation amplified laser of the optical resonator enters in the external optical resonator and thereby is burst-amplified.

2. The external optical resonator according to the above 1, comprising: a Two dimensional (2-D)-4 mirror optical resonator including a 2-D-4-mirror optic system which includes a pair of cylindrical concave mirrors and a pair of concave mirrors being arranged in the 2-D plane, an oscillation length controller device to adjust an optical path and a laser Compton scattering port to conduct collision of laser and electron beam; a laser feed port to guide laser in the 2-D-4-mirror optic system; an electron feed port to guide electron beam in the laser Compton scattering port; a radiation output port to output laser Compton scattering X-rays; wherein, laser introduced along the laser feed port is burst-amplified in the 2-D-4-mirror optic system and the most strengthened in the laser Compton scattering port, in order to conduct collision with electron beam introduced along the electron feed port and output laser Compton scattering X-rays along the radiation output port.

3. The optical resonator according to the above 1 or 2, including: the same optic system as that of the external optical resonator.

4. The external optical resonator according to any one of the above 1 to 3, including a polarization controller unit to control polarization of laser and oscillation controller unit to control oscillation of laser; wherein, laser is selectively sprit into right-circle polarized and/or left-circle polarized laser in accordance with the optical length through the intermediary of the polarization controller unit and oscillation controller unit.

5. The burst-laser generator using an optical resonator according to any one of the above 1 to 4, including a laser amplifier to pre-amplify a portion of the laser of the optical resonator, which is inserted between the optical resonator and the external optical resonator; wherein, a portion of the laser of the optical resonator is pre-amplified with the laser amplifier and the pre-amplified laser is burst-amplified with the external optical resonator.

6. The burst-laser generator using an optical resonator according to any one of the above 1 to 5, including an oscillation matching unit which is inserted between the optical resonator and the external optical resonator; wherein, burst-amplification by the external optical resonator is stabilized under the oscillation of the optical resonator by the oscillation matching unit.

Also, the present invention is able to produce quasi-monochromatic polarized high-luminance of X-rays as strong as synchrotron radiation X-rays through collision of polarized laser with pulse-strength of 1 mJ or more and beam size of 30 μm or less and electron beam with normalized emittance of 10 μm-rad or less with a collision angle in the range from 0 to 20 degrees in the laser Compton scattering port.

Advantageous Effects of Invention

The present invention provides a new burst-laser generator which produces high pulse-strength of burst-amplified laser in order to conduct laser Compton scattering. The generator comprises: a self-oscillation amplifying optical loop-path to self-oscillation amplify laser as circling on the optical loop-path which is formed with connecting an optical resonator, fiber laser amplifier, RF amplitude-modulator and exciting laser source with an adjusting cable; an external optical resonator to burst-amplify laser which is connected with the optical resonator in the self-oscillation amplifying optical loop-path; wherein, exciting laser beam supplied by the exciting laser source is self-oscillation amplified as circling on the self-oscillation amplifying optical loop-path and a portion of the self-oscillation amplified laser in the optical resonator enters in the external optical resonator and thereby is burst-amplified. The external optical resonator is able to produce laser with pulse-strength of 1 mJ or more and pulse-power of 1 MW or more. Further, the external optical resonator having a 2-D-4-mirror optic system is able to produce polarized laser with pulse-strength of 1 mJ or more and a beam size of 30 μm or less and to conduct collision with electron beam with normalized emittance of 10 μm-rad or less with a collision angle in the range from 0 to 20 degrees in the laser Compton scattering port.

The above advantage of the present invention has been achieved for the first time through the technology to control the resonance width below 0.1 Å in extremely short time. Despite high pulse-strength, the technology scarcely any more damages the used oscillation mirrors due to extremely short duration of the oscillation. The unexpectedly and surprisingly super accurate control in extremely short time in the present invention has been scarcely known.

DETAILED DESCRIPTION OF THE PREFERRED EMBODIMENTS

The present invention is a burst-laser generator using an optical resonator which is able to produce high-strength of burst-amplified laser for the purpose of laser Compton scattering, comprising: a self-oscillation amplifying optical loop-path which is formed with connecting at least an optical resonator, fiber laser amplifier, RF amplitude-modulator and exciting laser source with an adjusting cable; an external optical resonator to burst-amplify laser which is connected with the optical resonator in the self-oscillation amplifying optical loop-path.

As described above, the present invention has been achieved with the characteristic of collaborative laser-amplification with the external optical resonator to burst-amplify and the optical loop-path to amplify laser by self-oscillation.

Figure 1:
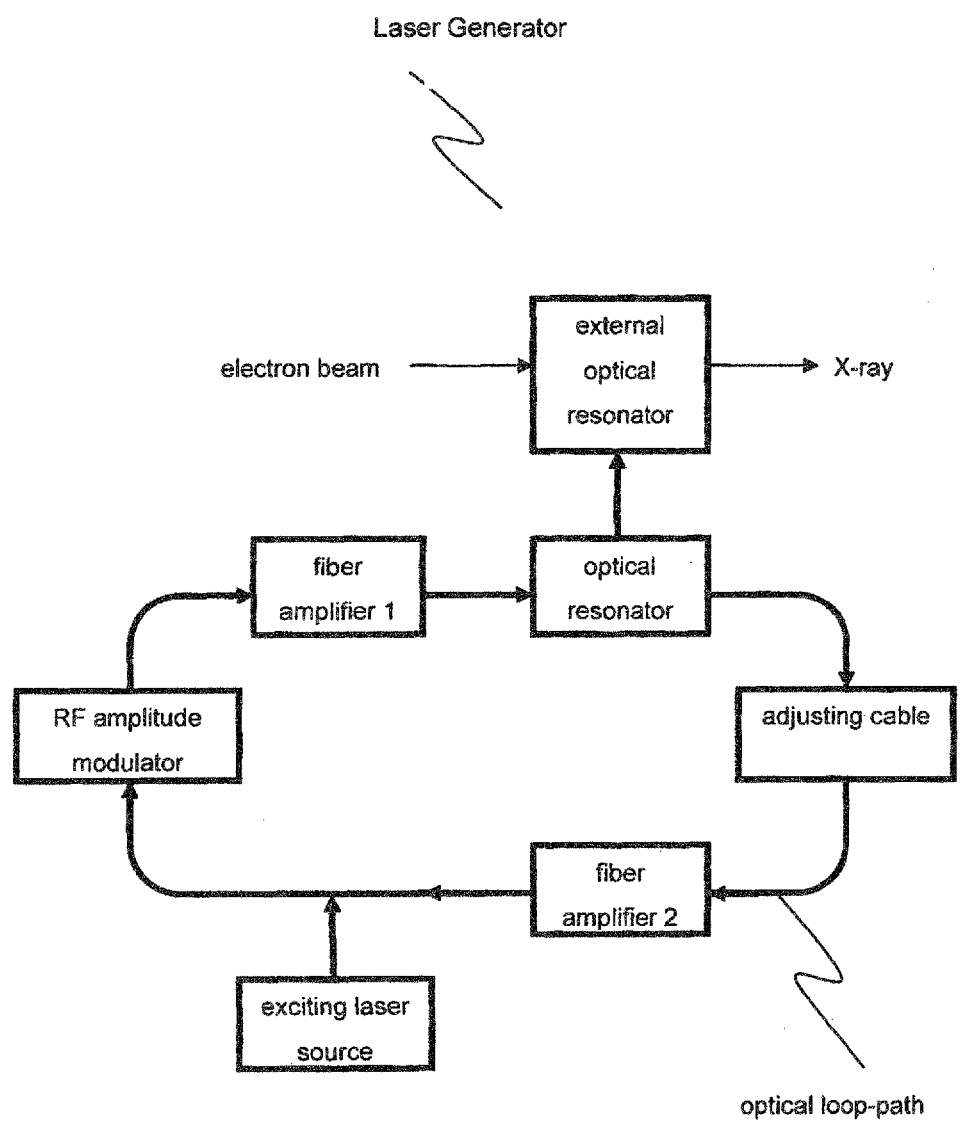
FIG. 1 is a schematic view illustrating a block diagram of an apparatus comprising an external optical resonator and optical loop-path according to the present invention.

As shown in FIG. 1, when an optical loop-path is formed with connecting an optical resonator and fiber laser amplifier with an adjusting cable, the laser-amplification with the optical resonator is automatically performable with self-oscillation, because, an optical length of the optical resonator is controllable using an oscillation signal of the optical loop-path. The self-oscillation enables the optical resonator to perform laser-amplification of 3,000 times or more and the regulation of 0.1 Å in resonance width. This has been impossible through the conventional optical resonator.

The self-oscillation-amplification can be performed with two methods, either the active mode-lock or reactivated mode-lock according to the method how to drive the RF-amplitude-modulator which is used for the optical loop-path. When seed-light is introduced in the optical loop-path, the seed-light after passing the optical resonator is acceptable to the resonance condition of the optical resonator. The active mode-lock is the method how the amplitude of the seed-light after passing the optical resonator is forced to be modulated so as to agree with a cycle of the optical loop-path through the RF-amplitude-modulator. The reactivated mode-lock is a method to reproduce an oscillation signal for driving the RF amplitude-modulator through the feedback optical path.

The concept of the burst-amplification of the present invention is to perform instantaneous and extremely high magnification of pulse-laser which enters from the optical resonator lying in the optical loop-path. A degree of the burst-amplification through the external optical resonator is usually 3,000 times or more, preferably 10,000 times or more and the most preferably 100,000 times or more. The above concept might be also applicable to the amplification through the laser amplifier which is inserted between the external optical resonator and the resonator in the optical loop-path, because the laser amplifier is capable of performing high laser-amplification similar to that for the external optical resonator.

In order to further amplify the laser of the optical resonator by 10,000 times or more, a very powerful external resonator is required.

In the present invention, a four-mirror optical resonator is preferable as the external optical resonator. As the four-mirror optical resonator, a three-dimensional 4-mirror (3-D-4-mirror) optical resonator or 2-dimensional-4-mirror (2-D-4-mirror) optical resonator having a pair of cylindrical concave mirrors and a pair of concave mirrors being arranged in the two-dimensional plane are preferable, because in these optic systems incident angle does never become perpendicular to the mirror plane, so that, the reflecting laser cannot return to the optical loop-path. Further, the 3-D-4-mirror optical resonator or 2-D-4-mirror optical resonator are most preferable as the vessel for laser Compton scattering. Further, the 2-D-4-mirror optical resonator having a pair of cylindrical concave mirrors and a pair of concave mirrors is the most preferable because this type of resonator is able to produce parallel laser beam with very narrow beam size, as described latter.

The conventional optical resonators having the two-mirror optical system are absolutely unsuitable for the external optical resonator, because incident angle becomes perpendicular to the mirror plane and accordingly the reflecting laser returns to the optical loop-path. When the reflecting laser retunes to the optical loop-path, the oscillation state in the optical loop-path disappears or turn to remarkable attenuation, accordingly a laser-amplification becomes difficult. To avoid this problem, even if using a mirror having extremely high refection of 99.99984%, it is absolutely impossible to control a very acute resonance width of as much as $10^{-3}$ Å corresponding to one-thousandth the size of hydrogen atom, through the conventional technology. Also, assuming to arrange the mirror in the manner that the reflection does not become perpendicular to the mirror plane, it is impossible to form the oscillation state due to bad reflection. Therefore, the conventional optical resonator cannot principally create an optical system similar to the system in the present invention.

The external optical resonator used for the present invention is preferably set under vacuum. The optical resonator having the optical system similar to that of the external optical resonator is also preferably set under vacuum. In order to achieve laser-amplification as much as 10,000 times, is required the operation under vacuum in order to protect the oscillation state of mode-lock laser from laser-scattering due to fine contaminants and airborne included in the optical path. This is also for the purpose of conducting collision with electron beam (laser Compton scattering) under vacuum. A degree of vacuum is preferably $10^{-6}$ Pa or less.

As the fiber laser amplifier used for the present invention, the conventional core-excitation typed fiber laser amplifiers can be utilized. The present invention usually uses the fiber laser amplifier which is doped with rare-earth materials as the induced emission medium. As the fiber laser amplifier doped with rare-earth materials, the single mode fiber laser amplifier doped with Yb is usually used. The single mode fiber laser amplifier doped with Yb is able to emit desired laser (1064 nm-laser) with high quantum efficiency on the reception of exciting laser supplied by an exciting laser source.

The RF amplitude-modulator used for the present invention is a modulator to modulate phase, amplitude and polarization of laser, utilizing electro-optic effect by impression of RF-power. The modulator is different from the conventional optical modulators such as Mach-Zender optical modulator which have been used for the optical communication media in respect to their purpose and function, because, the conventional optical modulator is to transform electric signals such as analog signal of voice and digital signal of image into intensity-modulated light (output signals) by means of modulating currents.

As the RF amplitude-modulator, the RF amplitude-modulator driven with RF-power can be used. For example, the Mach-zender light-intensity modulator can be used but is not limited to them. Frequency to drive the RF amplitude-modulator is preferably in the MHz region. Using the MHz region, it is possible to match driving frequency of the laser-amplifying with that of a RF-accelerator and to raise pulse-strength of laser.

As the exciting laser source used for the present invention, CW laser oscillator, pulse laser oscillator or mode-lock oscillator and the like can be used, but is not limited to them. Usually, a laser diode is utilized.

Further, the present invention is able to equip a laser-amplifier, which is inserted between the external optical resonator and the optical resonator, thereby it is possible to pre-amplify a portion of laser supplied by the optical resonator and to transmit the pre-amplified laser into the external optical resonator.

As the above laser amplifier, for example, a non-circular multi-fiber laser amplifier capable of step-by-step amplification, laser-diode exciting solid-laser-oscillator and the like can be used but is not limited to them.

Further, the present invention is able to equip an oscillation matching unit, which is inserted between the external optical resonator and the optical resonator, thereby it is possible to conduct the burst-amplification with the external optical resonator under stable condition.

The above oscillation matching unit is a method to attune the amplification by the external optical resonator with that for the optical loop-path. With this method, an oscillation signal of the external optical resonator can be made from an oscillation signal of the optical loop-path, accordingly, the oscillation state on the burst-amplification conducted by the external optical resonator can be stably and very easily maintained together with the amplification conducted by the optical loop-path. This unit is a method to conduct stable oscillation of plural optical resonators. The present invention equipping this unit is able to perform with very easy great amplification through the optical path [optical resonator—laser-amplifier—external optical resonator], because the laser amplified with the optical loop-path naturally is satisfying the resonance condition of the external optical resonator. It has been confirmed that the external optical resonator is able to control a resonation width of 0.1 Å without any trouble using this method.

The oscillation matching unit used for the present invention includes a feedback detection system which detects electric pulse signals generated through the laser source (the optical loop-path) and a compensating board which readouts the electric pulse-signals transmitted from the feedback detection system, generates driving-voltage according to the pulse-signals and transmits the driving-voltage to the oscillation length controller device of the external optical resonator. To perform this, the oscillation matching unit mounts calculation substrate on which a microprocessor to perform a variety of calculations, a LSI like FPGA (field-programmable gate array) and ASIC (application specific integrated circuit) with a calculating function. The present method is effective when using the optical loop-path as the laser source.

Figure 3:
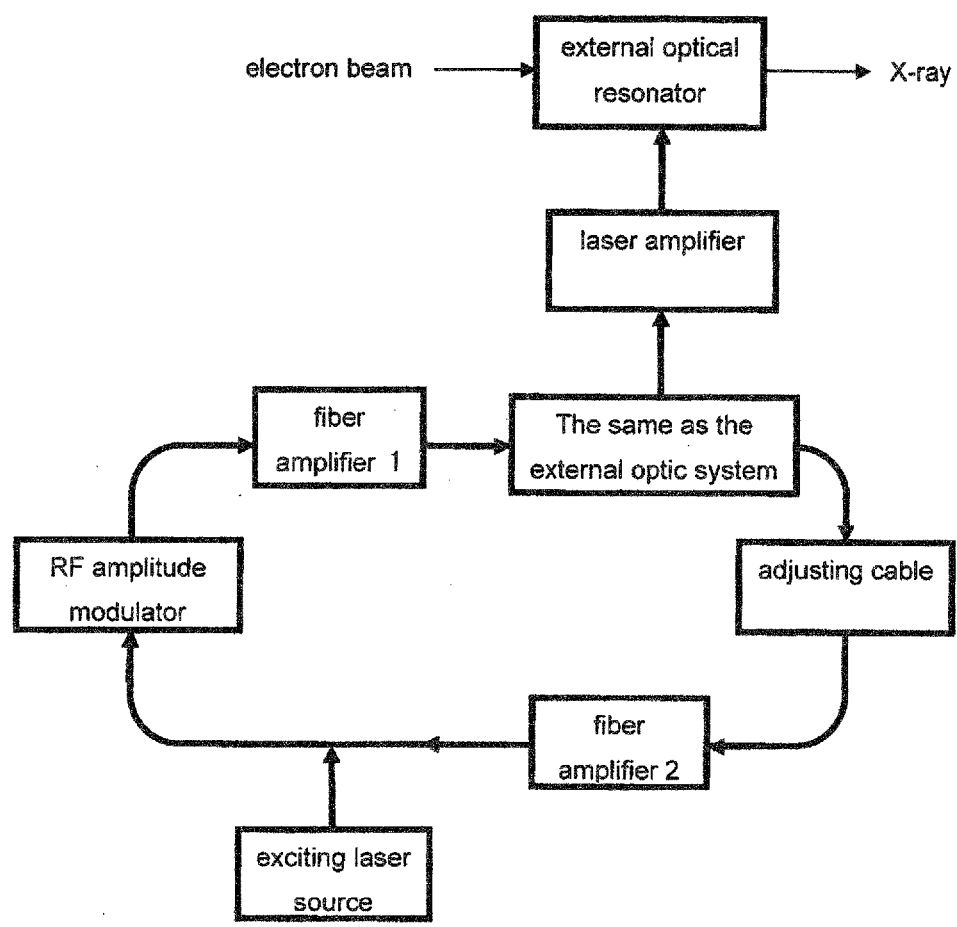
FIG. 3 is a schematic view illustrating a block diagram of an apparatus comprising an external optical resonator, laser amplifier and optical resonator having the same optic system as that of the burst-amplifying external optical resonator according to the present invention.

As the above feedback detection system, can be used a system similar to the system [λ/2 mirror 17—polarized beam splitter (PBS) 14—S-wave-polarizer-pin-photodiode 18—P-wave-polarizer-pin-photodiode 19—differential amplifier 20] as shown in FIG. 3.

As the above compensating board, can be used a system similar to the system [oscillation monitor 24—oscillation controller 25] as shown in FIG. 3.

In the present invention, the optical resonator having an optic system similar to that of the external optical resonator is the most preferable. When this is done, the optical resonator is able to burst-amplify laser in a similar manner as the external optical resonator, and also the matching of the oscillation state of the external optical resonator with that of the optical resonator lying in the optical loop-path can be performed with very easy. If both optic systems of the external optical resonator and optical resonator are different with each other, the operation to match both oscillation states turns to very difficult due to the mismatching of both oscillation states, accordingly, this case is impractical.

Figure 11:
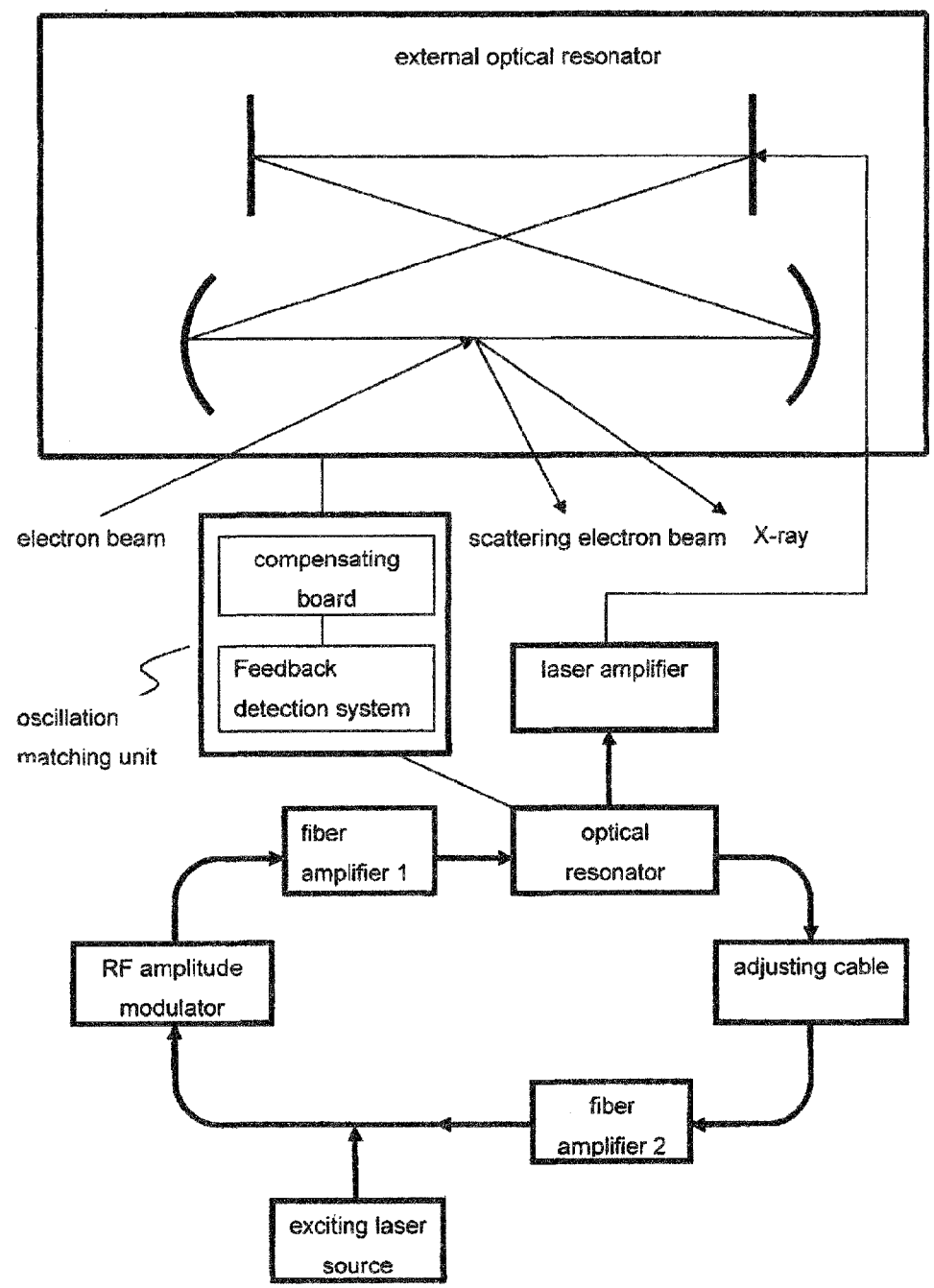
FIG. 11 is a schematic view illustrating a 3-D-4-mirror optical resonator or 2-D-4-mirror optical resonator according to the present invention.

As shown in FIG. 11, one of the 4-mirror optical resonators used as the external optical resonator is a 2-D-4-mirror optical resonator comprising a two-dimensional-four-mirror (2-D-4-mirror) optic system which includes a pair of cylindrical concave mirrors and a pair of concave mirrors being arranged in the 2-D plane, an oscillation length controller device to control an oscillation length of the 2-D-4-mirror optic system, a laser Compton scattering port to conduct collisions between laser and electron beam; a laser feed port to guide laser into the 2-D-4-mirror optic system; an electron beam feed port to guide electron beam into the laser Compton scattering port; and radiation output port to output resultant radiation.

The above cylindrical concave mirror is a mirror of which surface curve is a semi-cylindrical curve and the concave mirror is a mirror of which surface curve is a concave curve.

Generally, in the case of the conventional 2-D-4-mirror optic system comprising a pair of flat mirrors and a pair of concave mirrors, both incident and reflecting direction are not perpendicular to the respective mirror. Due to this gradient, vertical and horizontal focal length of the concave mirrors do not become equal and a beam profile at a laser convergent point between the concave mirrors turns to an ellipse. Because cross section areas of ellipses are larger than those of perfect circles, the conventional 2-D-4-mirror optic system produces weak laser beams in luminance.

The present inventors have found that cylindrical concave mirrors in substitution for flat mirrors are capable of narrowing a beam profile at a laser convergent point between the concave mirrors into a perfect circle. From this, the 2-D-4-mirror optical resonator used for the present invention enables the luminance to rise enormously greater than that of the conventional optical resonator.

Due to perfectly collimated laser beam given by the cylindrical concave mirrors, the 2-D-4-mirror optic system in the present invention enables optical matching of incident, exiting and reflecting laser beam in the optic system to be handled with very easy in comparison to the conventional optic system. The 2-D-4-mirror optic system in the present invention has been scarcely known.

Reflectance of all mirrors used for the 2-D-optic system is optimized to make resonant acuity (finesse) large. Finesse (F) is related with reflectance (R) in Eq. 1.

$$F = \frac{\sqrt[\pi]{R}}{1-R} \qquad \text{Eq. 1}$$

Other reason to use the mirrors of large R is to raise laser-resistance of the mirrors. Large reflectance of mirrors inhibits damages on mirror surfaces suffered by laser beams.

Reflectance (R) of the above mirrors used for the present invention are preferably 99.9%≤R<100%, more preferably 99.99%≤R<100%. If R is below 99.9%, finesse (F) is largely decreased and damages of the mirrors by laser beams become larger. R being more than 99.99% makes F very large and decreases the damages. The reason why R is less than 100% is to input-output laser through the mirrors. Usually, R is 99.999% or more.

The above mirrors used for the 2-D-4-mirror optic system are usually coated with dielectric multi-layers. The mirrors coated with dielectric multi-layers are relatively laser-resistant compared to the mirrors used for the conventional optical resonator. For example, the mirrors coated with dielectric multi-layers containing fluorides or single-crystalline diamond thin layers are preferable but not limited to them.

Laser resistance of the oscillating mirror used for the present invention is able to be evaluated as follows: laser with pulse strength of about 0.3 mJ and repetition of 357 MHz is injected into the 2-D-4-mirror optical resonator and oscillated for 10 min, followed by the examination of damages on the mirror surface. In the present invention, a mirror with no damage after the test is preferable.

The above oscillation length controller device is a device to control optical length between the concave mirrors. The device is set in a holder supporting the concave mirror, and moved together with the holder by impressed voltage depending on oscillation states. Piezoelectric devices are preferable as the oscillation length controller device.

The above laser Compton scattering port is a chamber to conduct collisions of laser beam and electron beam. The laser Compton scattering port is equipped with an electromagnet in front and backside of the port, respectively. The collision with electron beam is performable by controlling in precise an incident angle close to head-on collision of electron beam against facing laser with the electromagnet which is equipped in front of the laser Compton scattering port. An orbit of the scatting electron beam after the collision is bent with the electromagnet which is equipped in a back side of the port, in order to separate and remove the scattering electron beam after the collision from laser Compton scattering X-ray. The laser Compton scattering port is usually set on an optical path in the optic system of the external optical resonator, and is the most preferably set at a midpoint of the resonator length where a beam size of the resonant laser becomes a minimum, and doing this, the laser in the optic system is the most strengthened in the laser Compton scattering port.

In order to generate high strength of laser Compton scattering X-ray in the laser Compton scattering port, pulse-strength of laser is preferably as strong as possible and beam size is preferably as small as possible. In the present invention, polarized laser with pulse-strength of 1 mJ or greater and beam size of 30 μm or smaller is preferable so as to collide with electron beam in the laser Compton scattering port. Further, polarized laser with pulse-strength of 1 mJ or greater and beam size of 20 μm or smaller is more preferable. Because, polarized laser having pulse-strength of 1 mJ or more and a beam size of 30 μm or less is able to generate high-strength of polarized X-ray micro-beams. Because a theoretical minimum size of laser of the present 2-D-4-mirror optic system is 5 μm, the minimum beam size which can be produced by the present invention is 5 μm.

Normalized emittance of electron beam which collides with laser beam in the laser Compton scattering port is preferably 10 μm-rad or less. Because, the electron beam having normalized emittance of 10 μm-rad or less is able to generate high luminance of X-ray.

Collision angle between laser beam and electron beam in the laser Compton scattering port is preferably in the range from 0 to 20 degrees, because, this range is preferable to raise probability of the collision and to generate quasi-monochromatic X-ray.

The above laser feed port is a guide to guide laser beam into the above cylindrical concave mirrors. The guide is usually attached to a side of the burst-amplifying external optical resonator body so as to guide laser beam to the cylindrical concave mirror by an adequate incident angle.

The above electron beam feed port is a guide to guide electron beams into the laser Compton scattering port. The guide is usually attached to a side of the burst-amplifying external optical resonator body so as to guide electron beam in the laser Compton scattering port by an adequate incident angle.

The above radiation output port is a guide to output laser Compton scattering radiation. The guide is usually attached to a side of the external optical resonator body, for example, a side behind the resonant concave mirror, so as to output X-ray by an adequate output angle.

Further, the external optical resonator used for the present invention is able to equip a polarization controller unit to control selective right-circle or left-circle polarization of the laser beam in the optic system and an oscillation control unit to control the oscillation state of each polarized laser.

Figure 14:
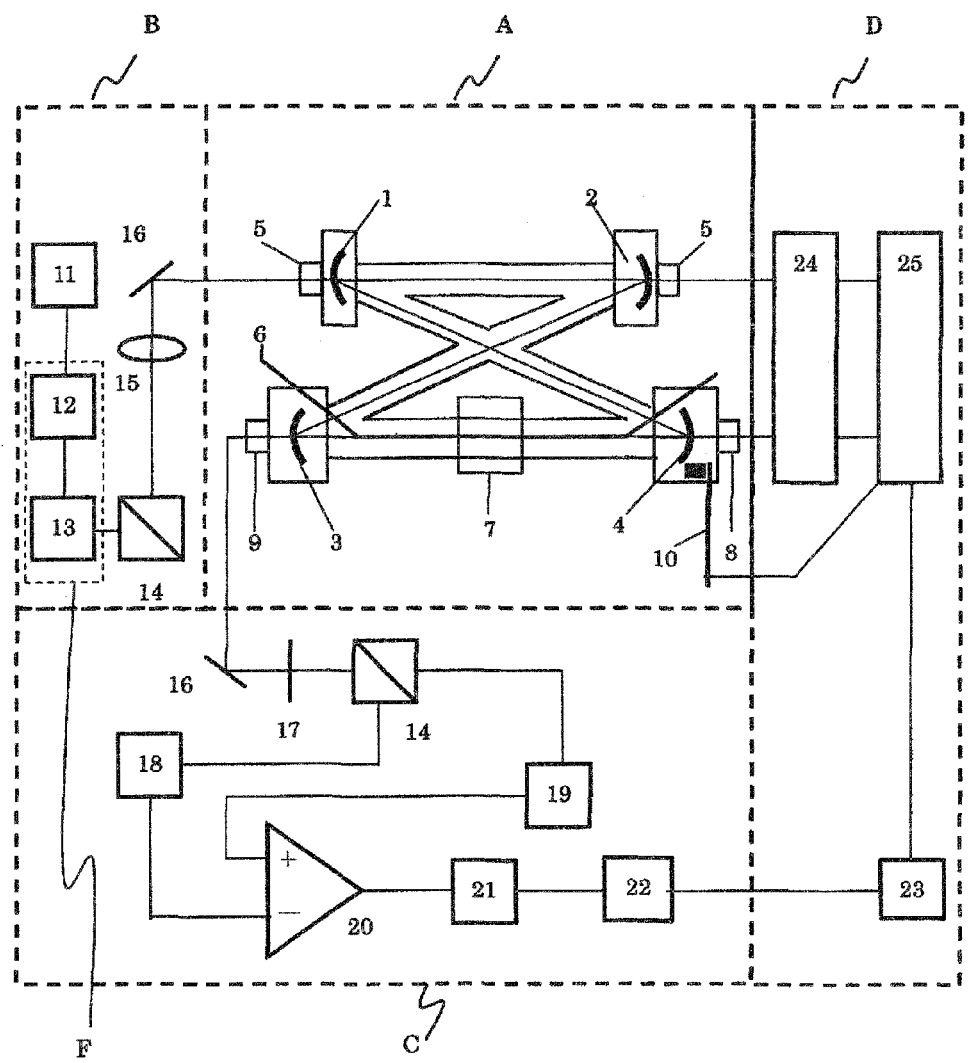
FIG. 14 is a schematic view illustrating the 2-D-4-mirror optical resonator including an oscillation matching unit, polarization control unit and oscillation control unit according to the present invention.

The above polarization controller unit is a system to detect a polarization state of the resonant laser. As shown in FIG. 14, the system includes plural reflecting mirrors to guide laser to a position being apart from the optic system by a predetermined distance, a half-wave plate to adjust a polarization face reflected by the final stage of reflecting mirror, a polarization beam splitter to sprit the laser the polarization face adjusted by the half-wave plate into P-polarized beam and S-polarized beam, a respective pin-photodiode to generate the respective beam strength signal indicating laser strength of the respective polarized beam, a differential amplifier to calculate differential between the respectively polarized beam strength signal output, a zero-cross determination circuit to determine the difference signal output from the differential amplifier, a zero-cross feedback signal generator to generate zero-cross feedback signal from the result of determination of the zero-cross determination circuit and the like, and also includes a calculation substrate mounting a microprocessor to perform a variety of calculations, a LSI with a calculating function assembled and the like.

The above oscillation controller unit is a system to control the oscillation length controller device (piezoelectric device) in the optic system receiving signals from the above polarization controller unit. As shown in FIG. 14, the system includes a polarization changeover-switch to output an indicating signal to indicate a selective right-polarization or left-polarization beam on the reception of zero-cross feedback signal supplied by the zero-cross feedback signal generator, an oscillation monitor to measure laser strength of resonant laser, an oscillation controller to control controlling-voltage of a piezoelectric device embedded in the optic system on the basis of the outputs of the polarization changeover-switch and resonance monitor and zero-cross feedback generator, and the like, and also includes a calculation substrate mounting a microprocessor to perform a variety of calculations, a LSI with a calculating function assembled and the like. The present polarization and oscillation controlling technology is based on the measurement of slight difference in beam length between right-polarization and left-polarization beam.

Further, the present invention is able to equip an electron beam generator unit to supply high-energy electron beam into the external optical resonator. The electron beam generator unit includes a RF signal generator and a high-energy electron beam generator which generates high-energy electron beam accelerated with RF voltage synchronized with the RF signal generator. As the high-energy electron beam generator, a RF linear accelerator is preferably used.

Hereinafter, the present invention will be specially explained as an execution embodiment using the following drawings.

FIG. 1 is a schematic view illustrating a block diagram of an apparatus comprising an external optical resonator and self-oscillation amplifying optical loop-path according to the present invention, wherein, laser is self-amplified with the optical loop-path, a portion of the amplified laser in the optical resonator enters in the burst-amplifying optical resonator, and is further burst-amplified with the external optical resonator.

As shown in FIG. 1, the self-oscillation amplifying optical loop-path [RF amplitude-modulator—fiber laser amplifier (1)—optical resonator—adjusting fiber cable—fiber laser amplifier (2)—RF amplitude-modulator] is the optical loop-path in which self-oscillation amplification of laser is carried out. A length of the adjusting cable is attuned so as to tune in exactly an optical length of the loop. The exciting laser source is inserted in the optical path between the RF intensity-modulator and fiber laser amplifier 1. Arrows denote a flow of light.

The oscillation starts with the occurrence of spontaneous emission optical noise of the fiber laser amplifier. Exciting laser is introduced into the fiber laser amplifier 1 or 2 by the optical loop-path, induces natural emission of the fiber laser amplifier 1 or 2, generates noise light, and the noise light enters in the optical resonator. Only a spectrum component of the noise light which happens to be acceptable with a resonation width of the optical resonator is passing the optical resonator, and enters in the RF amplitude-modulator, and is forced to be modulated with amplitude so as to agree with a frequency of the optical loop-path (active mode-lock). This laser is so called seed-light. The laser (seed-light) enters in the fiber laser amplifier 1 or 2, induces stimulated emission of the fiber laser amplifier 1 or 2 to generate new laser, the new laser is amplified with every event of stimulated emission and with every passing the laser fiber amplifier, the amplified laser enters in the optical resonator, and is further amplified with the same repetition cycle as that of pulse laser propagating the optical loop-path. Here, a frequency (for example, 357 MHz) of the optical resonator is in advance adjusted to an integral multiple of the optical loop-path length (for example, 35.7 MHz). In this way, a cycle of the optical loop-path is automatically transformed into the cycle of the optical resonator, accordingly, the amplification with the optical resonator and that with the optical loop-path is cooperatively conducted (referred to self-oscillation-amplification).

The above self-oscillation amplification starts with a loop-gain more than 1 and comes to an equilibrium state within several hundred µsec to several msec. In this process, resonant laser is generated with an optic system and a portion of the resonant laser is transmitted by the resonant mirror, returns to the optical loop-path, induces stimulated emission of the fiber laser 1 or 2 to generate new laser. Since this cycle is automatically repeating, accordingly, very strong laser is generated in the optical resonator.

In parallel to this process, a portion of the above amplified laser of the optical resonator enters in the external optical resonator and is burst-amplified. When a laser-resistant mirror with reflectance of 99.99% is used, laser-amplification over 10,000 times can be achieved. At this time, feedback signals of oscillation state of the external optical resonator have been made from those of the optical resonator lying in the mode-locked optical loop-path, thereby the resonance during burst-amplification is automatically maintained. In this system, seed-light is amplified by 10~1,000 times with the optical resonator and further burst-amplified by 10,000 times with the external optical resonator, accordingly, laser with pulse strength of $10^5~10^7$ times as large as that of seed-light can be produced with the external optical resonator.

Figure 2:
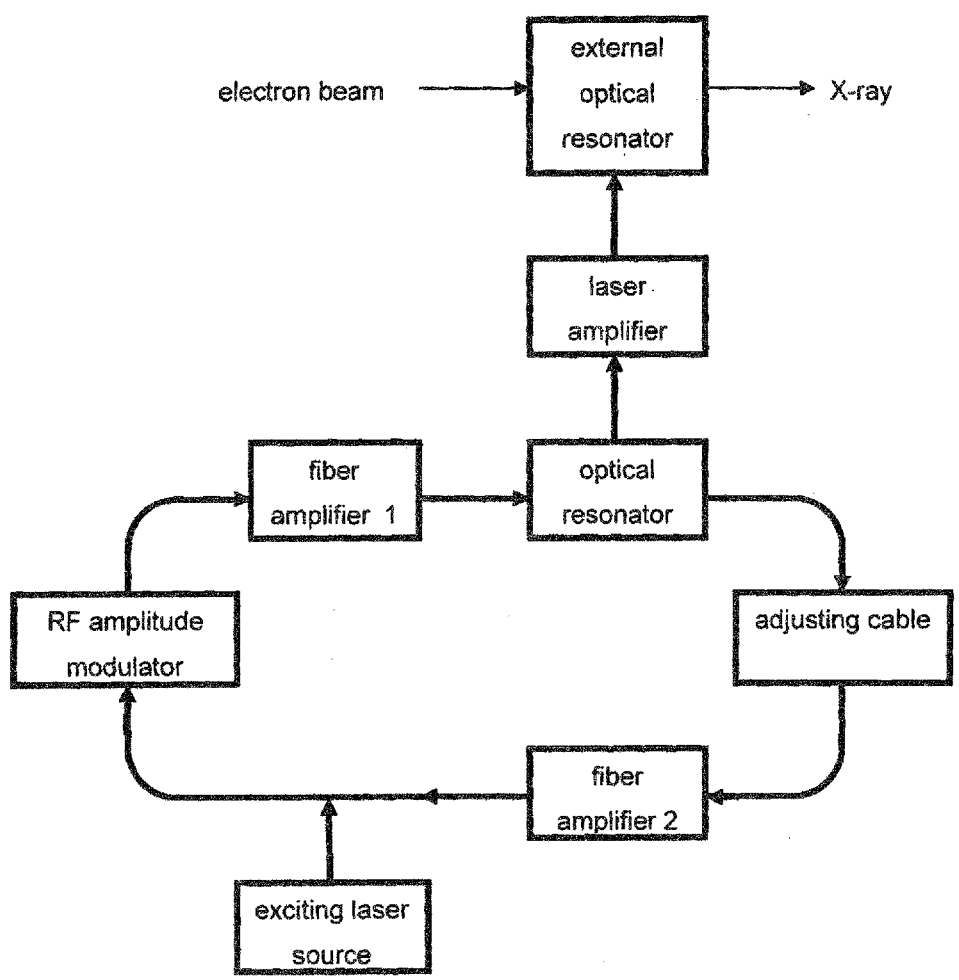
FIG. 2 is a schematic view illustrating a block diagram of an apparatus comprising an external optical resonator, laser amplifier and optical loop-path according to the present invention.

FIG. 2 shows an apparatus in which the laser amplifier is inserted between the optical resonator and the external optical resonator. In this system, a portion of the self-oscillation amplified laser of the optical resonator enters in the laser amplifier, thereby is pre-amplified, the pre-amplified laser enters the external optical resonator, thereby is burst-amplified.

In FIG. 2, for example, seed-light is amplified by 10~1,000 times with the optical resonator, a portion of the amplified laser enters in the laser amplifier, thereby is further amplified by 10~10,000 times, enters in the external optical resonator, thereby is burst-amplified by 10,000 times, accordingly, laser with pulse-strength of $10^6~10^{11}$ times as large as that of seed-light can be produced with the external optical resonator.

FIG. 3 shows an apparatus in which the optical resonator has the same optic system as that of the external optical resonator, and the laser amplifier is inserted between the optical resonator and the external optical resonator, wherein, a portion of the self-oscillation amplified laser of the optical resonator enters in the laser amplifier, thereby is further amplified, the amplified laser enters in the external optical resonator, thereby is burst-amplified.

In FIG. 3, for example, seed-light is amplified by 10~1,000 times with the optical resonator, a portion of the amplified laser in the optical resonator enters in the laser amplifier, thereby further is amplified by 10~10,000 times with the laser amplifier, and the amplified laser enters in the external optical resonator, thereby is burst-amplified by 10,000 times with the external optical resonator, accordingly, laser with pulse-strength of $10^6~10^{12}$ times as large as that of seed-light can be produced with the external optical resonator.

Figure 4:
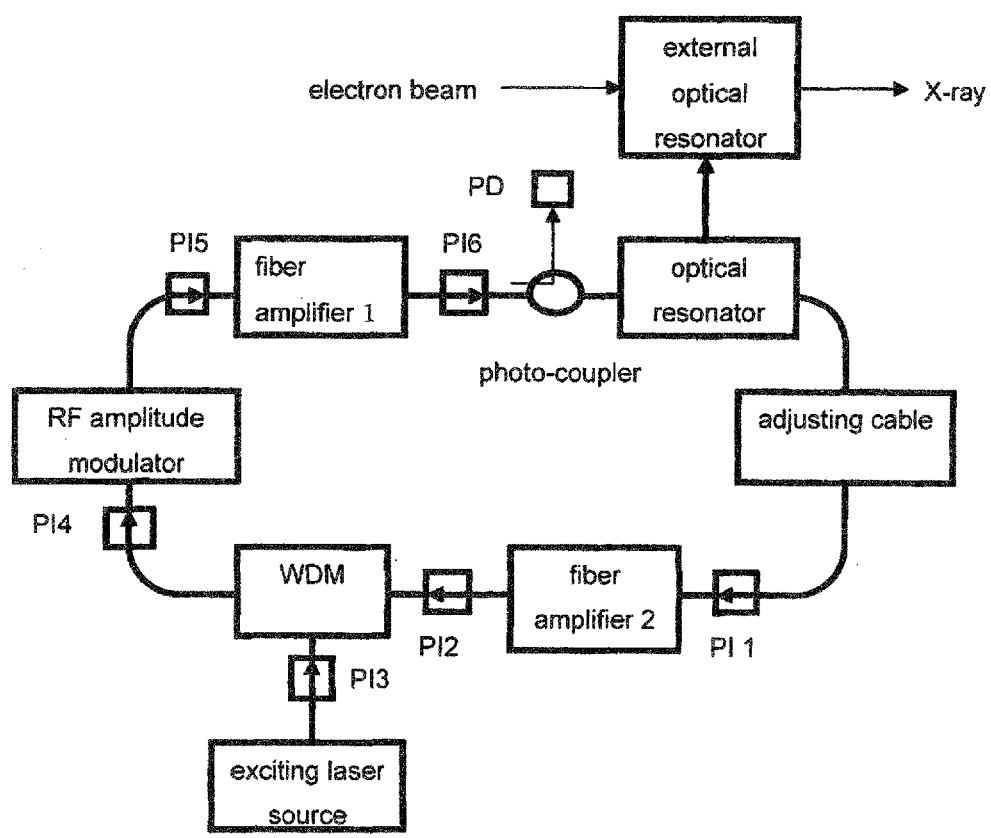
FIG. 4 is a schematic view illustrating a block diagram of an apparatus comprising an external optical resonator and active mode-lock optical loop-path according to the present invention.

FIG. 4 shows an apparatus in which the external optical resonator is connected with the optical resonator lying in the active mode-locked optical loop-path, wherein, a portion of the active mode-locked laser generated with the optical resonator is burst-amplified with the external optical resonator.

In FIG. 4, for example, self-oscillation amplification with the active mode-lock optical loop-path is conducted through the optical loop-path [the exciting laser source (LD)—the branching/multiplexing unit (WDM)—the RF amplitude-modulator—the fiber laser amplifier (1)—the optical resonator—the adjusting optical fiber cable—the fiber laser amplifier (2)].

In FIG. 4, for example, when seed-light with pulse-strength of 100 pJ is introduced into the optical loop-path, pulse-strength of the seed light is amplified to 1 nJ (amp. of 10 times)~0.1 µJ (amp. of 1000 times) with the optical resonator, further burst-amplified to 10 µJ~1 mJ (amp. of 1,000 times) with the external optical resonator. The experiment which was carried out using the 3-D-4-mirror optical resonator with the mirrors coated with dielectric multi-layers containing fluorides as the external optical resonator showed that the oscillation mirror was not damaged when pulse-strength of the resonant laser became 300 µJ or more and showed that the oscillation mirror was quite stable to laser with pulse-strength of 1 mJ when the 2-D-4-mirror optical resonator was used as the external optical resonator.

Figure 5:
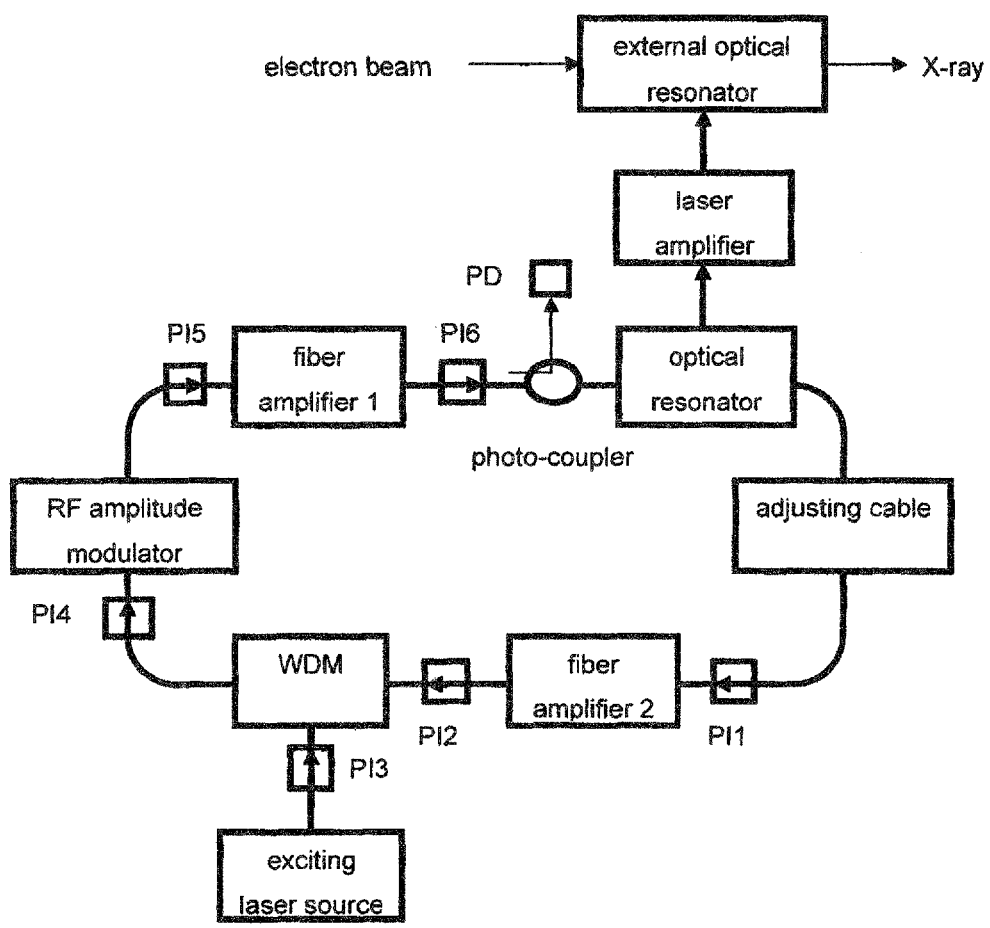
FIG. 5 is a schematic view illustrating a block diagram of an apparatus comprising an external optical resonator, fiber laser amplifier and active mode-locking optical loop-path according to the present invention.

FIG. 5 shows an apparatus in which the laser amplifier is inserted between the external optical resonator and the optical resonator lying in the active mode-locked optical loop-path, wherein, a portion of the active mode-locked laser produced with the optical resonator is amplified with the laser amplifier and further burst-amplified with the external optical resonator.

As the above laser amplifier, for example, a non-circular multi-step fiber laser amplifier to step-by-step amplify laser, laser-diode exciting fiber laser amplifier, laser-diode exciting solid-laser and the like can be used. For example, the laser-diode exciting fiber laser amplifier comprising the step-by-step amplifier [Pre-amp.—Main-amp.—Burst-amp.] (this "Burst" means to occur explosive stimulated emission) is able to amplify laser by 10 times with Pre-amp., by 20 times with Main-amp., and by 50 times with Burst-amp., accordingly, totally by 10,000 times, is more preferable.

In FIG. 5, for example, when seed-light with pulse-strength of 1 pJ is introduced into the optical loop-path, the seed-light is amplified to 10 pJ (amp. of 10 times)~1 nJ (amp. of 1,000 times) with the optical resonator, further amplified to 100 pJ~0.1 µJ (amp. of 10,000 times) with the laser amplifier, burst-amplified to 1 µJ (amp. of 10,000 times)~100 mJ (amp. of 10,000 times) with the external optical resonator.

Figure 6:
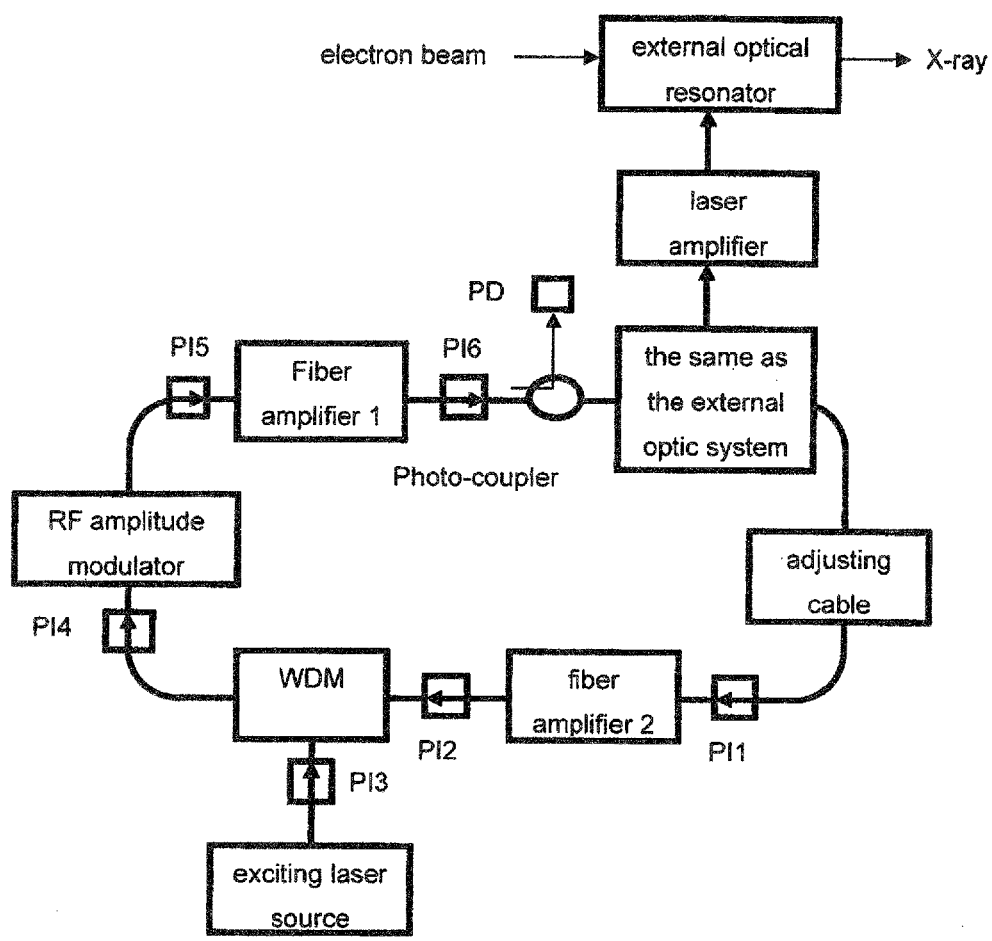
FIG. 6 is a schematic view illustrating a block diagram of an apparatus comprising an external optical resonator and optical resonator having the same optic system as that of the external optical resonator and active mode-locking optical loop-path according to the present invention.

FIG. 6 shows an apparatus in which the optical resonator has an optical system similar to that of the external optical resonator, the laser amplifier is inserted between the external optical resonator and the optical resonator lying in the active mode-locked optical loop-path, wherein, a portion of the burst-amplified laser with the optical resonator is further amplified with the laser amplifier, further burst-amplified with the external optical resonator.

In FIG. 6, for example, when seed-light with pulse-strength of 0.1 pJ is introduced into the optical loop-path, pulse-strength of the seed-laser is amplified to 1 pJ (10 times)~1 nJ (10,000 times) with the optical resonator, further amplified to 10 pJ (10 times)~10 µJ (10,000 times) with the laser amplifier, further burst-amplified to 0.1 µJ (10,000 times)~100 mJ (10,000 times) with the external optical resonator.

Figure 7:
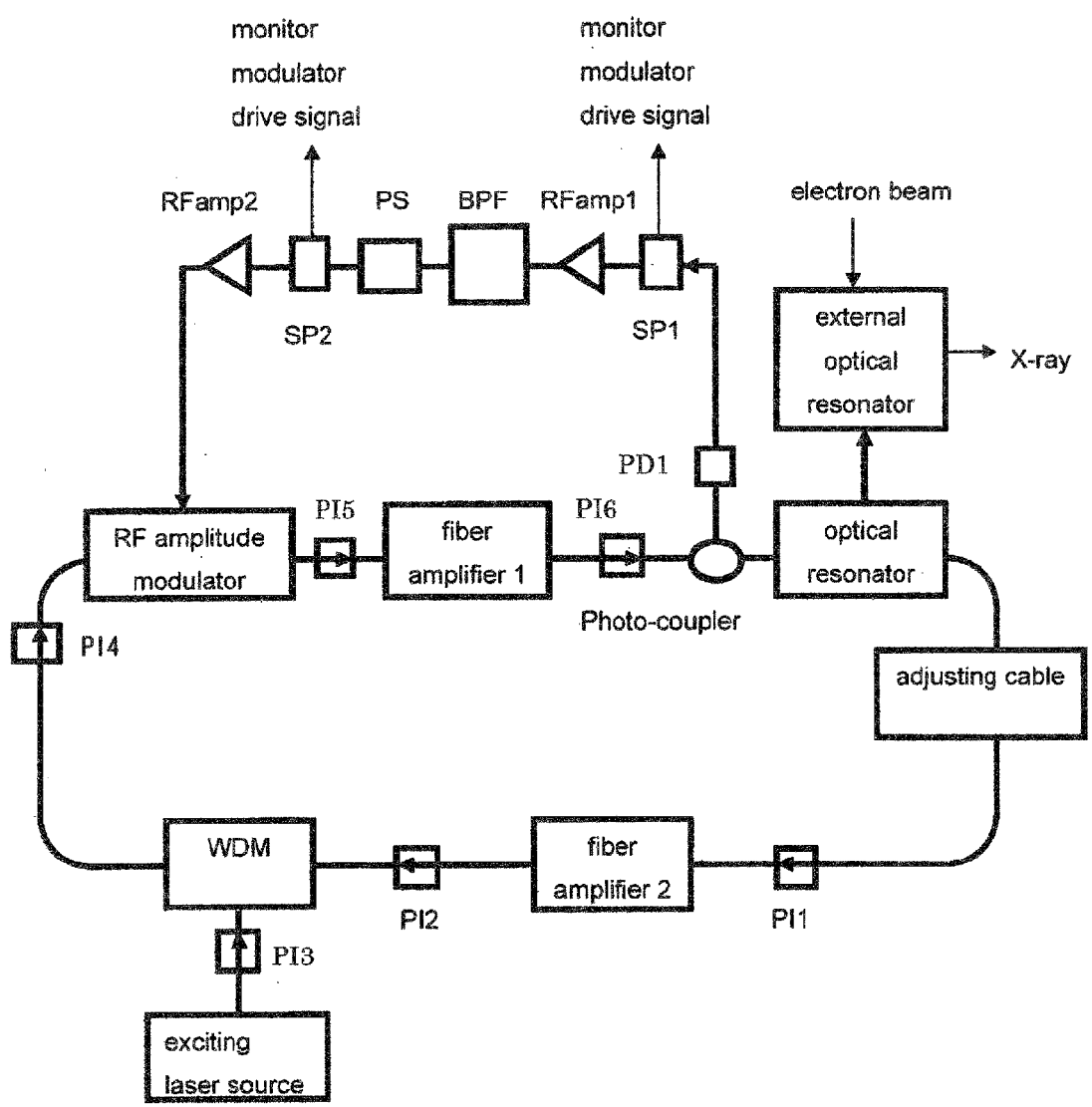
FIG. 7 is a schematic view illustrating a block diagram of an apparatus comprising an external optical resonator and reactivated mode-locking loop-path according to the present invention.

FIG. 7 shows an apparatus in which the external optical resonator is connected with the optical resonator lying in the reactivated mode-locking optical loop-path, wherein, a portion of the amplified mode-locked laser in the optical resonator is further burst-amplified with the external optical resonator.

As shown in FIG. 7, the reactivated mode-locking method is characterized by preparing self-oscillation signals which are accurately matched with a fundamental frequency of the system to drive the RF amplitude-modulator with a branching optical path to electrically extract a noise of a laser-oscillator itself instead of using an external modulator. The above reactivated mode-locking method is operated in the following way. A portion of the circular laser in the fundamental optical loop-path is extracted with an photo-coupler and monitored with a photodiode (PD1), the signal detected with PD1 is amplified with RF amp., super mode noise components to be grown are extracted with a band-pass-filter (BPF) of 357 MHz±±7 MHz, amplified with the RF amplifier and phase-adjusted with a phase-shifter (PS), amplified with RF amp., and drives the RF amplitude-modulator which is arranged at the input side of the fiber amplifier. The method has advantages to stabilize pulse-oscillation due to the relationship between modulated signals and loop-path length independent upon oscillation-fluctuation. Using this reactivated mode-locking method, it is possible to produce highly amplified laser as well as the activated mode-locking method.

As shown in FIG. 7, the self-oscillation amplifying optical loop-path using the above reactivated mode-locking method is comprising the fundamental optical loop-path [optical resonator—adjusting optical fiber cable—optical isolator (PI1)—fiber laser amplifier (1)—PI2—(exciting laser source—PI3)—branching/multiplexing unit (WDM)—PI4—RF amplitude-modulator—PI5—fiber laser amplifier (2)—PI6—10% photo-coupler—optical resonator] and the feedback optical loop-path [10% photo-coupler—photo-diode (PD1)—beam splitter (SP1)—RF amp.—band-pass filter (BPF)—phase-shifter (PS)—SP2—RF amp.—RF amplitude-modulator].

In FIG. 7, for example, when seed-light with pulse-strength of 100 pJ is introduced into the fundamental optical loop-path, the seed-light is amplified to 1 nJ (10 times)~0.1 µJ (1,000 times) with the optical resonator, a portion of the amplified laser of the optical resonator is further burst-amplified to 10 µm (10,000 times)~1 mJ (10,000 times) with the external optical resonator.

Figure 8:
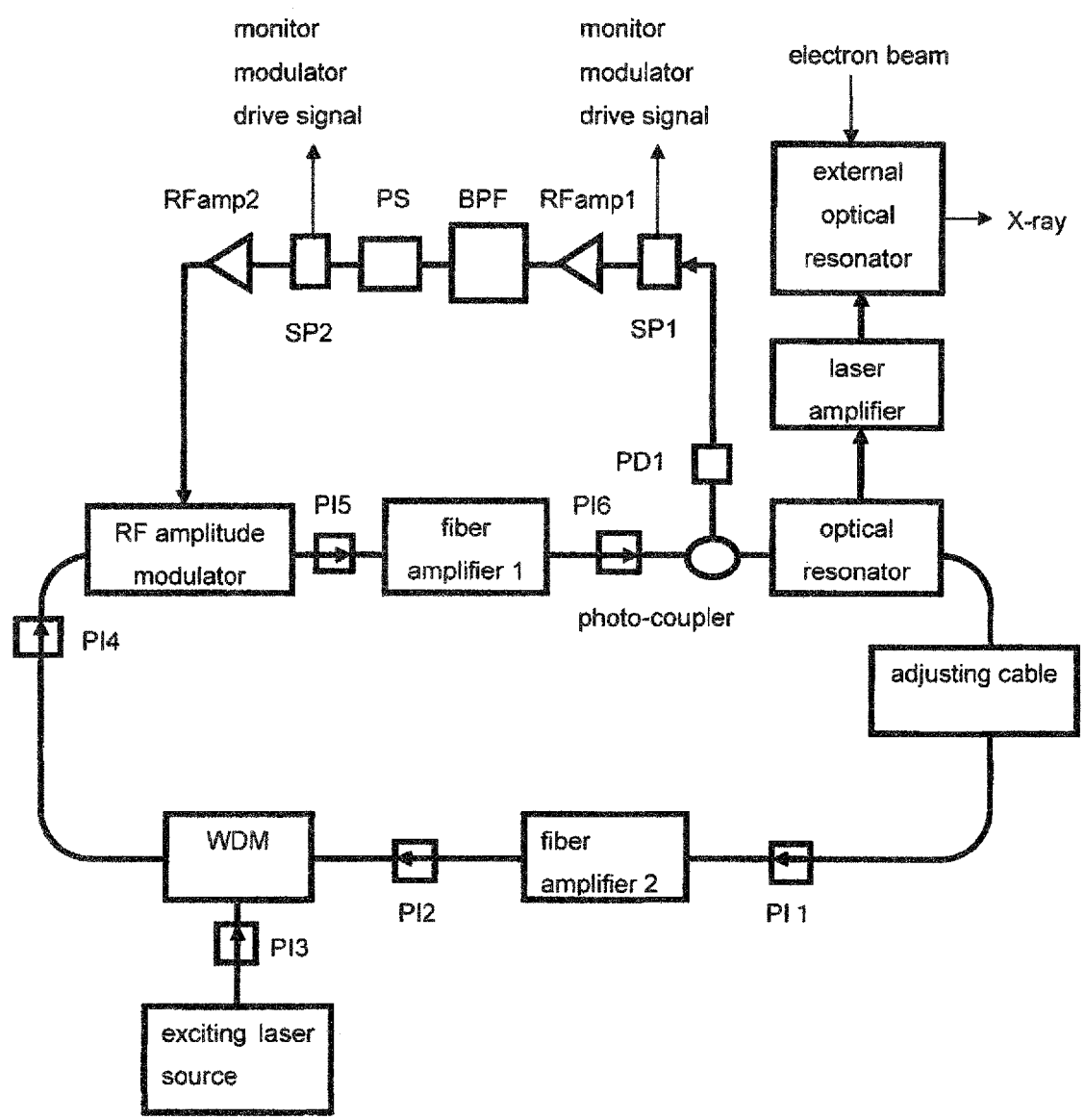
FIG. 8 is a schematic view illustrating a block diagram of an apparatus comprising an external optical resonator, laser amplifier and reactivated mode-locking optical loop-path according to the present invention.

FIG. 8 shows an apparatus in which the laser amplifier is inserted between the external optical resonator and the optical resonator connected with the reactivated mode-locking optical loop-path, wherein, a portion of the amplified laser of the optical resonator is further pre-amplified with the laser amplifier, and further burst-amplified with the external optical resonator.

In FIG. 8, for example, when seed-light enters in the fundamental optical loop-path, the seed light is amplified to 10 pJ (10 times)~1 nJ (1,000 times) with the optical resonator, a portion of the amplified laser of the optical resonator is further pre-amplified to 100 pJ (10 times)~10 µJ (10,000 times), and further burst-amplified to 1 nJ (10 times)~100 mJ (10,000 times).

Figure 9:
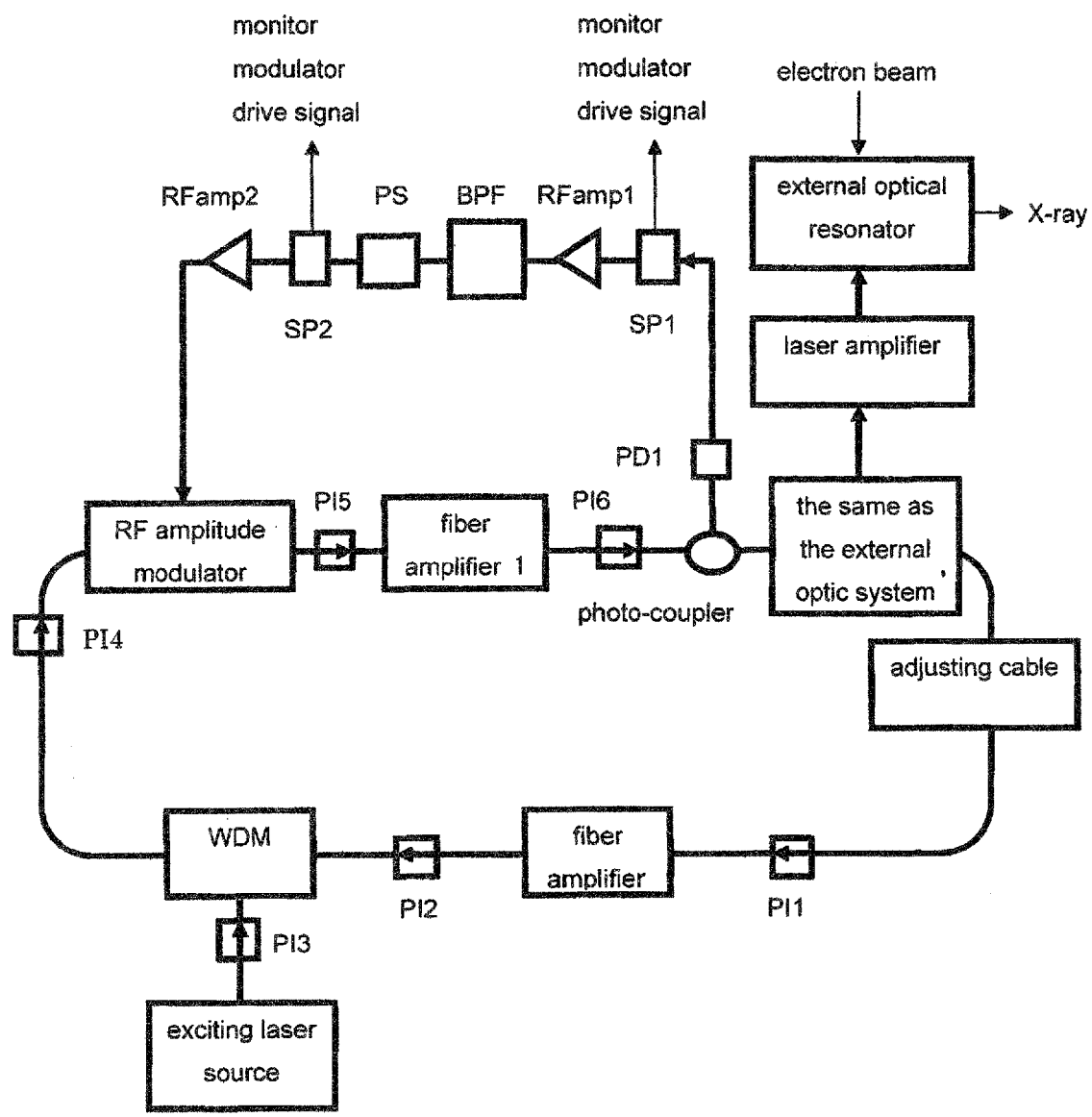
FIG. 9 is a schematic view illustrating a block diagram of an apparatus comprising an external optical resonator, laser amplifier and optical resonator having the same optic system as that of the external optical resonator and reactivated mode-locking loop-path according to the present invention.

FIG. 9 shows a system in which the optical resonator has the same optic system as that of the external optical resonator and the laser amplifier is inserted between the external optical resonator and the optical resonator connected with the reactivated mode-locking optical loop-path, wherein, the mode-lock laser produced by the optical loop-path is burst-amplified with the optical resonator, a portion of the amplified laser of the optical resonator is further pre-amplified with the laser amplifier, and further burst-amplified with the external optical resonator.

In FIG. 9, for example, when seed-light with pulse-strength of 0.1 pJ is introduced into the fundamental optical loop-path, pulse-strength of the seed-light is amplified to 1 pJ (10 times)~1 nJ (10,000 times) with the optical resonator, a portion of the amplified laser of the optical resonator is pre-amplified to 10 pJ (10 times)~10 µJ (10,000 times) with the laser amplifier, further burst-amplified to 0.1 µJ (10,000 times)~100 mJ (10,000 times) with the external optical resonator.

Figure 10:
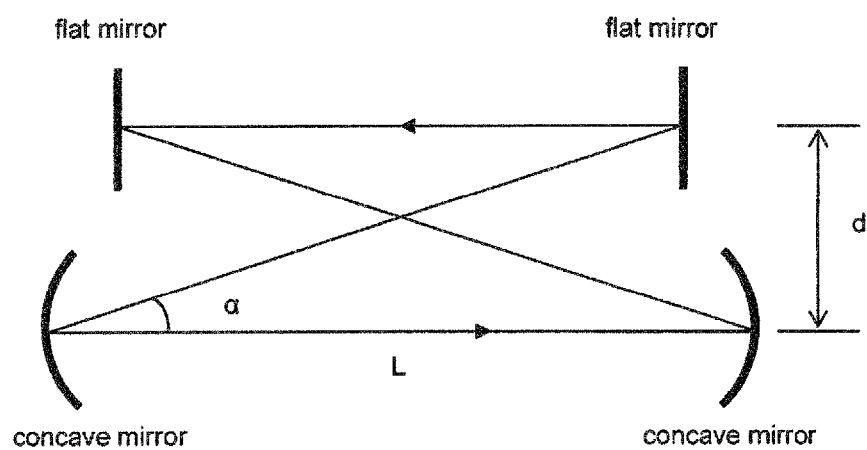
FIG. 10 is a schematic view illustrating an optic system of an external optical resonator according to the present invention.

FIG. 10 shows a 4-mirror optic system utilized as the external optical resonator according to the present invention. The system comprises a pair of flat mirrors and a pair of concave mirrors. A three-dimensional-4-mirror optic system has a configuration in which a line connecting the flat mirror and concave mirror is rotated at 90°. A 2-D-4-mirror optic system has a configuration in which the flat mirrors are substituted with a pair of cylindrical concave mirrors (FIG. 12).

FIG. 11 shows an apparatus in which the external optical resonator has a 4-mirror optic system, a laser amplifier and an oscillation matching unit as stated above are inserted between the external optical resonator and the optical resonator, respectively, wherein, burst-amplification through a path connecting the laser amplifier and the external optical resonator is conducted with automatic self-oscillation through the intermediary of the oscillation matching unit. In this system, electric pulse-signals indicating the oscillation state of the optical resonator are transmitted to the oscillation matching unit, thereby transformed into driving-voltage depending on the oscillation state, the driving-voltage is transmitted to the oscillation length controlling device of the external optical resonator, accordingly, the burst-amplification of the external optical resonator is stably performed thereby. In this system, for example, when seed-light with pulse-strength of 1 pJ enters in the optical loop-path, pulse-strength of the seed-light is amplified to 10 pJ (10 times)~1 nJ (1,000 times) with the optical resonator, a portion of the amplified laser of the optical resonator is pre-amplified to 100 pJ (10 times)~10 µJ (10,000 times) with the laser amplifier, further burst-amplified to 1 µJ (10,000 times)~100 mJ (10,000 times) with the external optical resonator.

Figure 12:
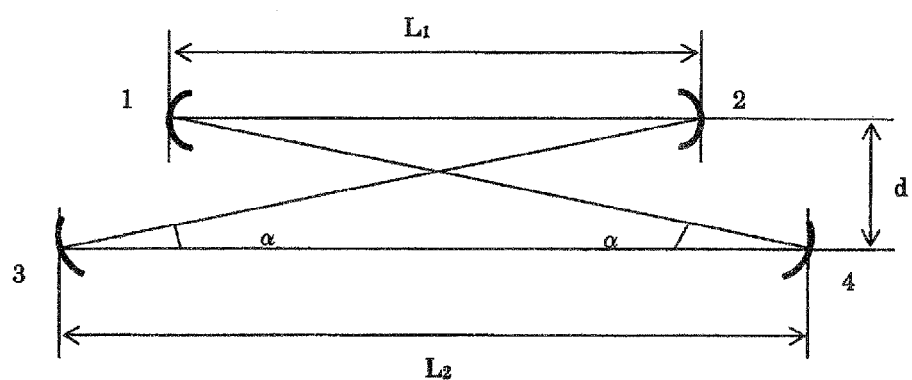
FIG. 12 is a schematic view illustrating another optic system of the 2-D-4-mirror optical resonator according to the present invention.

FIG. 12 shows a 2-dimensional (2-D)-4-mirror optic system which is another 4-mirror optic system as the 4-mirror optic system of the external optical resonator according to the present invention. The optical parameters of the 2-D-4-mirror optic system are a distance $L_1$ between a pair of cylindrical concave mirrors, a distance (resonator length) $L_2$ between a pair of concave mirrors, a resonator width d and an incident angle α. The parameters are optimized so as to minify as much as possible beam sizes (beam waists) $\omega_0$ of laser light between the a pair of concave mirrors. The optimization raises flux of laser Compton scattering X-rays, because the more the beam size becomes small, the more the flux becomes large. In the present invention, a mode-lock laser of λ=1064 nm is used. $L_2$ is preferably 1075 mm in length according to the resonance-conditions. The value of $\omega_0$ can be estimated from a relationship between $\omega_0$ of perpendicular and horizontal laser beams and S-parameter which is obtained by envelop-calculation using a beam expander in the Gaussian beam optics. Here, the S-parameter is a position of laser beam lying in the line between the concave mirrors. As the result, the present inventors have found that each laser size $\omega_0$ converges to a minimum of 5 µm at S=537.6 mm, as shown in FIG. 5. Also, the present inventors have found that the region (stabilized resonant area) formed by overlapping the respective relationship between $\omega_0$ and S-parameter for the perpendicular and horizontal laser beams is enlarged as an optics. The obtained $\omega_0$ (=5 µm) is one-tenths the $\omega_0$ (=50 µm) for the conventional mode-lock laser oscillator (50 W power, 10 ps/pulse pulse time width, 1064 nm wavelength, 150 MHz repetition). Therefore, the present invention enables the luminance to rise by 100 times compared to the conventional mode-lock laser oscillator. Therefore, the laser Compton scattering port is the most preferably set at a midpoint of the resonator length where a beam size of laser in the optic system is the most narrowed.

The above resonator width d and incident angle α is optimized so as to make convergences of perpendicular and horizontal laser at the concave mirrors maximum. In the present invention, d is preferably 240 mm and a is preferably 0.20 radian (11.4°).

Figure 13:
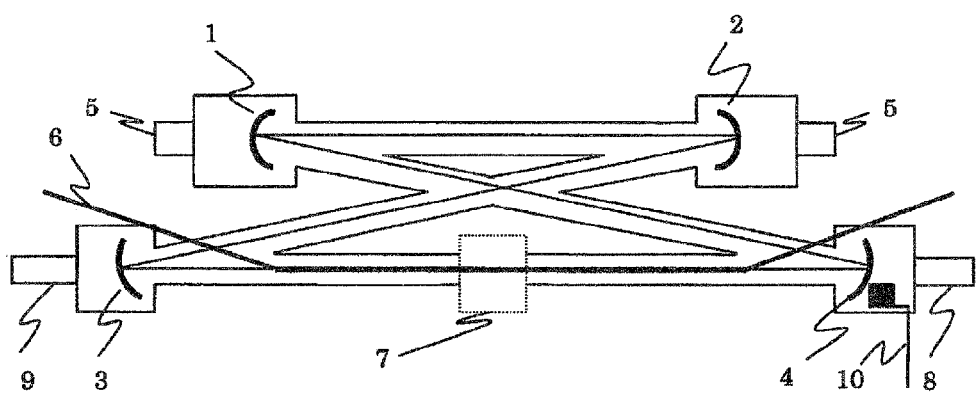
FIG. 13 is a schematic view illustrating a structure of the 2-D-4-mirror optical resonator according to the present invention.

FIG. 13 shows an optical resonator utilized for the external optical resonator according to the present invention. The resonator comprises the 2-D-4-mirror optic system which includes a pair of cylindrical concave mirrors 1-2 and a pair of concave mirrors 3-4, wherein both mirrors are arranged in the 2-D plane, the oscillation length controller device 10 to control of an optical path length in the optic system, the laser Compton scattering port 7 to conduct collisions of laser beam and electron beam, the laser feed port 5 to guide laser beam of the laser source 11, the electron beam feed port 6 to guide electron beam, and the radiation output port 8 to output radiation, and is able to introduce a part of resonant laser beam into a polarization controller unit C through a laser exit port 9 being behind the concave mirror 3.

As shown in FIG. 14, the above 2-D-4-mirror optical resonator is able to equip a laser source unit B to supply laser to the 2-D-4-mirror optic system, a polarization control unit C to control the polarization of the 2-D-4-mirror optic system and an oscillation control unit D to control the oscillation state of the 2-D-4-mirror optic system. The above laser source unit includes a laser source (the self-oscillation optical loop-path according to the present invention), the oscillation matching unit as stated above, and an optical path to guide laser to the 2-D-4-mirror optic system.

The above 2-D-4-mirror optical resonator is set under vacuum less than $10^{-6}$ Pa. When a start switch is turned on, laser from the laser source 11 is emitted, enters in the feedback system 12 and the compensating board 13, thereby is synchronized with the laser of 2-D-4-mirror optic system, enters in the polarized beam splitter 14 and the collimate lens 15, whereby is adjusted a polarization face and beam diameter of the laser, enters in the flat mirror 16, enters behind the cylindrical concave mirror 1 of the 2-D-4-mirror optical system, is transmitted through the cylindrical concave mirror 1, is confined in the route in the order of the cylindrical concave mirror 2, the concave mirror 3, concave mirror 4, cylindrical concave mirror 1 and cylindrical concave mirror 2.

Further, in parallel to the above operation, the strength of laser transmitted through the cylindrical concave mirror 2 is measured by the oscillation monitor signal is generated by the oscillation monitor 24, and supplied to the oscillation controller 25. The oscillation monitor 24 includes a pin-photodiode which measures laser strength and generates monitor signals (large signals when laser is resonant in the resonator).

Further, in parallel to the above operation, the zero-cross feedback signal generator 22 in the polarization controller unit C includes the flat mirror 16 which reflect laser transmitted through the concave mirror 3 out of resonating laser in the 2-D-4-mirror optic system and guides the laser to a position being apart from the 2-D-4-mirror optic system by a predetermined distance, the half-wave plate 17 which adjusts a polarization face of the laser reflected by the flat mirror 16 of the final stage as being adjusted to form an attaching angle corresponding to a distance from the 2-D-4-mirror optic system, the polarization beam splitter 14 which splits the laser with polarization face adjusted by the half-wave plate 17 into P-polarized light and S-polarized light, the flat mirror 16 which reflects laser of the S-polarized light side split by the polarization beam splitter 14, the pin photodiode 18 which receive the laser of the S-polarized light side reflected by the flat mirror 16 and generates an S-polarized light strength signal indicating laser strength of the S-polarized light side, the flat mirror 16 which reflects laser of the P-polarized light side split by the polarization beam splitter 14, the pin-photodiode 19 which receives the laser of the P-polarized light side reflected by the flat mirror 16 and generates a P-polarized light strength signal indicating laser strength of the P-polarized light side, the differential amplifier 20 which calculates difference between the S-polarized light strength signal output from the pin-photodiode 18 and the P-polarized light strength signal output from the pin-photodiode 19 and generates a difference signal, and the zero-cross feedback signal generator 22 which generates a zero-cross feedback signal indicating a result of determination whether or not zero-crossing occurs at the difference signal output from the zero-cross detector 21, whether zero-crossing occurs from the plus side to the minus side or from the minus side to the plus side when zero-crossing occurs, and the like. The polarization controller unit C performs introducing of the laser transmitted through the concave mirror 3 out of the resonant laser in the 2-D-4-mirror optic system, splitting of the laser into P-polarized light and S-polarized light, measuring of strength thereof, obtaining of the difference value between there, generating the zero-cross feedback signal indicating whether or not zero-crossing occurs at the difference signal output from the differential amplifier 21, whether zero-crossing occurs from the plus side to the minus side or from the minus side to the plus side when zero-crossing occurs, and the like, and supplying the signal to the oscillation controller 25. The polarization change-over switch 23 generates, based on setting, an instruction signal to alternately assign right circular polarization or left circular polarization in accordance with an instruction signal assigning right circular polarization (or left circular polarization) or a high frequency signal output from the high frequency signal generating unit and supplies the signal to the oscillation controller 25.

Further, in parallel to the above operation, driving-voltage with a voltage value increased like a ram-shape is generated by the oscillation controller 25 and is supplied to the piezoelectric device 10 in the 2-D-4-mirror optical resonator A, so that the optical path length of the 2-D-4-mirror optic system is adjusted.

Here, either right circular polarization or left circular polarization (e.g., right circular polarization) is assigned with an instruction signal output from the polarization change-over switch 23. Under the above conditions, when a zero-cross feedback signal indicating detection of right circular polarization is generated by the zero-cross feedback signal generator 23 in the polarization controller unit C and a monitor signal indicating that laser is oscillating in the 2-D-4-mirror optic system is output from the oscillation monitor 24, the oscillation controller 25 fixes the voltage value of the drive voltage as detecting the above.

Accordingly, the optical path length in the 2-D-4-mirror optic system is fixed at that time and resonance against the laser of right circular polarization is maintained in the 2-D-4-mirror optic system for a specified period.

The oscillation controller 25 includes a calculation substrate on which a microprocessor to perform a variety of calculations, a LSI with a calculating function assembled or the like is mounted. The oscillation controller 25 generates drive voltage having a ramp-shaped voltage value or a voltage value required for selecting laser of right circular polarization or left polarization in the 2-D-4-mirror optical resonator A based on the instruction signal output from the polarization change-over switch 23, a monitor signal output from the oscillation monitor 24 and a zero-cross feedback signal output from the polarization controller unit C, and supplies the drive voltage to the piezoelectric device 10 of the 2-D-4-mirror optical resonator A. Thus, the oscillation controller 25 controls the optical path length of the 2-D-4-mirror optical resonator A and selectively accumulates laser of right circular polarization or left circular polarization into the 2-D-4-mirror optical resonator A.

Here, a line width of the pulse laser is determined by a mode-locking oscillation frequency and a time width of the pulse laser. Further, a beam size of the pulse laser at the collision point is 30 μm or smaller in the 2-D-4-mirror optical resonator A. Accordingly, as long as the time width of the pulse laser is 30 psec or shorter, it is possible to set pulse strength at the collision point in the 2-D-4-mirror optical resonator A to be 1 mJ or higher. Here, using the concave mirrors 1-4 which are coated with laser-resistant dielectric multi-layers, it is possible to set pulse strength to be 10 mJ or greater.

Similar control is performed as well as in the case that an instruction signal assigning right circular polarization and left circular polarization alternately is output from the polarization change-over switch 23, so that pulse laser of right circular polarization (high-strength pulse laser) and pulse laser of left circular polarization (high-strength pulse laser) alternately resonate and are amplified in the 2-D-4-mirror optical resonator A.

Here, a line width of the pulse laser is determined by a mode-locking oscillation frequency and a time width of the pulse laser. Further, a beam size of the pulse laser at the collision point is 30 μm or smaller in the 2-D-4-mirror optical resonator A. Accordingly, as long as the time width of the pulse laser is 30 psec or shorter, it is possible to set pulse strength at the collision point in the 2-D-4-mirror optical resonator A to be 1 mJ or higher. Here, using the concave mirrors 1-4 which are coated with laser-resistant dielectric multi-layers, it is possible to set pulse strength to be 10 mJ or greater.

Figure 15:
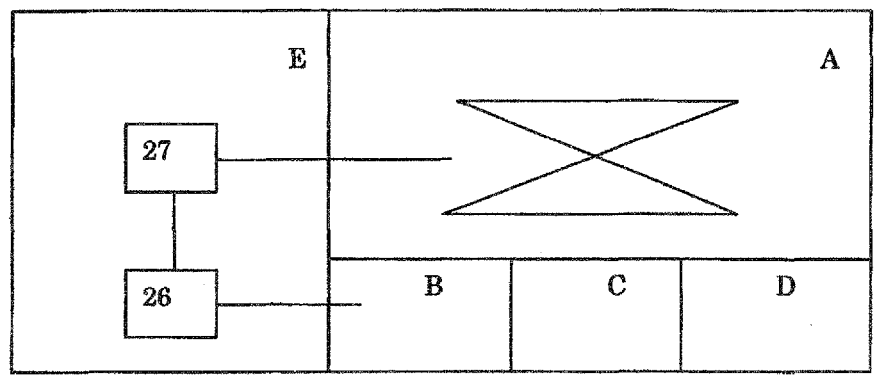
FIG. 15 is a schematic view illustrating the 2-D-4-mirror optical resonator including a laser source unit, polarization controller unit, oscillation controller unit and electron beam generator according to the present invention.
Figure 16:
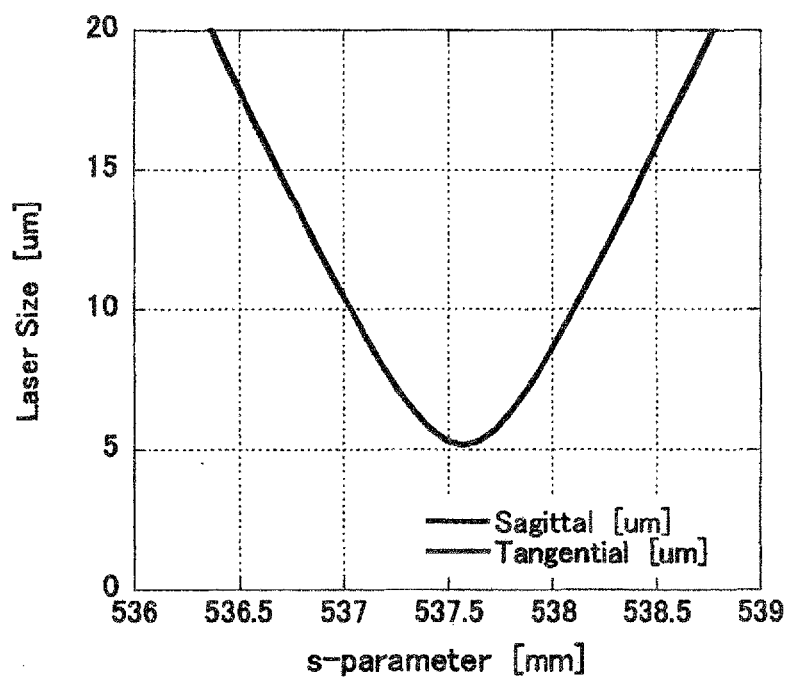
FIG. 16 is a view illustrating a relationship between laser-beam size and S-parameter for the 2-D-4-mirror optical resonator according to the present invention.

As shown in FIG. 15, the above 2-D-4-mirror optical resonator is further able to equip an electron beam generator unit F to provide high-luminance of electron beam to the 2-D-4-mirror optical resonator. The electron beam generator unit E includes a high-energy electron beam generator 27 and a RF signal generator 26. Electron beam are accelerated by the high-energy electron beam generator 27 using voltages synchronized with RF signals from the RF signal generator 26, and supplied to the 2-D-4-mirror optical resonator A. An accelerator shots pulse electron beam in exact timing with the burst-amplification with the external optical resonator. Further, in parallel to the above operation, mode-lock laser is generated by the laser source unit B, supplied to the 2-D-4-mirror optical resonator A, the polarization is adjusted by the polarization controller unit C, and the oscillation state is adjusted by the oscillation controller unit D.

Figure 17:
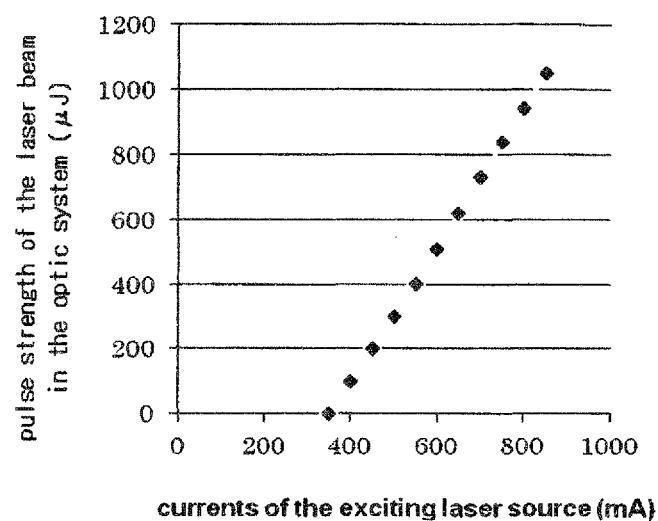
FIG. 17 is a view illustrating a relationship between observed pulse strength and currents of the exciting laser source according to the present invention.
Figure 18:
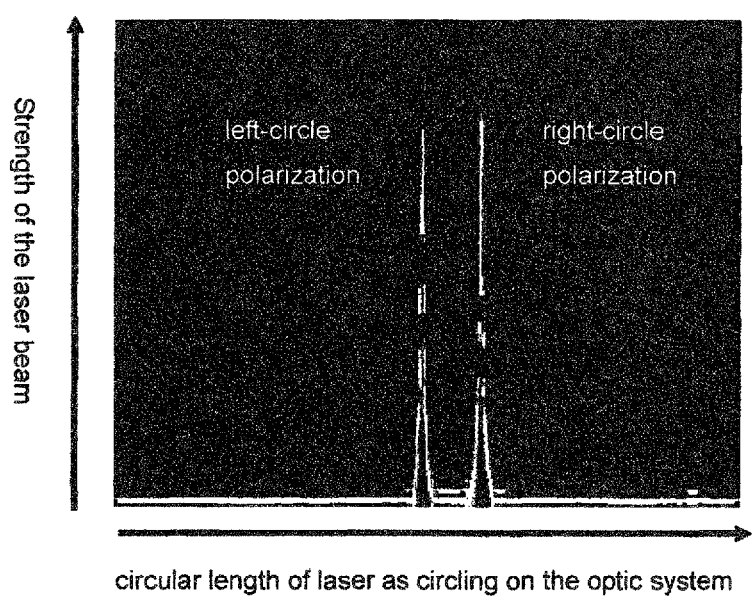
FIG. 18 is a view illustrating an oscillation state of laser beam according to the present invention.

The present inventors observed pulse strength and oscillation state of the resonant laser using the burst-laser generator as shown in FIG. 11. As the external optical resonator, the 2-D-4-mirror optical resonator as shown in FIG. 14, is used. The cylindrical concave mirrors and concave mirrors having 99.99% in reflectance were used. Pulse strength of the seed laser supplied into the self-oscillation loop-path was set to about 0.1 μJ ($10^{-7}$ J). The results are shown in FIGS. 17 and 18. FIG. 17 shows the result of the relationship between pulse-strength and currents of the exciting laser supplied in the self-oscillation loop-path, which was measured using a photodiode. From the result, it has been confirmed that pulse strength of 1 mJ and amplification of 10,000 times can be achieved. The result also shows that resonant width of 0.1 Å is achieved. FIG. 18 shows the result of the oscillation state of resonant laser which was observed with an oscilloscope. From the result, it has been confirmed that resonant laser can be split into right polarization and left polarization laser.

As the summary, the burst-laser generator according to the present invention comprising a self-oscillation amplifying optical loop-path and an external optical resonator to burst-amplify laser is able to produce high pulse-strength of polarized laser being strong enough to generate high strength of quasi-monochromatic polarized X-ray which is very useful as the X-ray source for the purpose of industrial usages. Also, the external optical resonator utilizing the 4-mirror optical resonator, in particular, utilizing the 2-D-

4-mirror optical resonator which is able to produce parallel laser beams having a perfect circle narrow beam profile and enables laser beam optics to be handled very easily, is able to produce high-strength of polarized laser having pulse-strength of 1 mJ or more and beam size of 30 µm or less which is very useful for wide variety of industrial usages.

INDUSTRIAL APPLICABILITY

The present invention has industrial applicability as relating to a polarized laser oscillation method, a polarized radiation generation method, and a device and a system thereof for a X-ray source to generate an X-ray micro-beam using laser Compton scattering and the like, and in particular, relating to a device and a system thereof being capable of freely selecting right or left circular polarization. The present invention is useful for a variety of industrial usages such as medical instrument, diagnostic instrument, material analyzer, structural analyzer, material processing, and the like.

What is claimed is:

1. A burst-laser generator using an optical resonator which produces high pulse-strength of laser to conduct laser Compton scattering, comprising:
    a self-oscillation amplifying optical loop-path formed to generate laser, the self-oscillation amplifying optical loop-path comprising an optical resonator, a fiber laser amplifier, an RF amplitude-modulator and an exciting laser source and an adjusting cable connected in loop, wherein the self-oscillation amplifying optical loop-path is configured to self-oscillation amplify last supplied by the exciting laser source as the laser circles in the self-oscillation amplifying optical loop-path; and
    an external optical resonator connected with the optical resonator in the self-oscillation amplifying optical loop-path and configured to receive the laser self-oscillation amplified by the self-oscillation amplifying optical loop-path and burst-amplify the received laser, wherein the external optical resonator comprises mirrors so arranged in the external optical resonator that the received laser is to be incident upon one of the mirrors at an incident angle which is not perpendicular to a plane of the one of the mirrors so that the received laser will not go back to the self-oscillation amplifying optical loop-path.

2. The burst-laser generator according to claim 1, wherein the external optical resonator comprises:
    a two dimensional (2-D)-4 mirror optical resonator including a pair of cylindrical concave mirrors and a pair of concave mirrors being arranged in a 2-D plane to shape the received laser to have a parallel beam profile and a cross-section of perfect circle;
    an oscillation length controller device configured to adjust optical paths formed by the cylindrical concave mirror or the concave mirror;
    a laser Compton scattering port located in one of the optical paths formed in the 2-D-4 mirror optical resonator in which the laser and an electron beam collide with each other;
    a laser feed port configured to guide the laser in the 2-D-4-mirror optic resonator;
    an electron feed port configured to guide the electron beam in the laser Compton scattering port; and
    a radiation output port configured to output laser Compton scattering X-rays, resulting from collision of the laser and the electron beam
    wherein the laser introduced by the laser feed port into the 2-D-4-mirror optic resonator is shaped by the 2-D-4-mirror optic resonator to have a parallel beam profile and a cross-section of perfect circle,
    the laser shaped to have the parallel beam profile and a cross-section of perfect circle collides in the laser Compton scattering port with the electron beam introduced by the electron feed port, and
    the laser Compton scattering X-rays resulting from collision of the laser and the electron beam is output at the radiation output port.

3. The burst-laser generator according to claim 1, wherein the optical resonator in the self-oscillation amplifying optical loop-path comprises an optical resonator formed similarly to the external optical resonator so that the optical resonator in the self-oscillation amplifying optical loop-path will amplify laser in a similar manner as the external optical resonator amplifies laser.

4. The burst-laser generator according to claim 1, further comprising a laser amplifier located between the optical resonator in the self-oscillation amplifying optical loop-path and the external optical resonator and configured to pre-amplify the laser from the optical resonator in the self-oscillation amplifying optical loop-path and supply the pre-amplified laser to the external optical resonator, wherein the laser amplifier is one of a non-circular multi-step fiber laser amplifier configured to perform a step-by-step amplification of laser or a laser-diode exciting solid-laser oscillator.

5. The burst-laser generator according to claim 2, further comprising an oscillation matching unit inserted between the optical resonator in the self-oscillation amplifying optical loop-path and the external optical resonator, the oscillation matching unit being formed with a field programmable gate array operable (i) as a feedback detection system to detect electric pulse signals from the optical resonator in the self-oscillation amplifying optical loop-path and (ii) a compensating board to transform the detected electric pulse signals into a feedback signal and supply the feedback signal to the oscillation length controller device of the external optical resonator, wherein the feedback signal controls the oscillation length controller device to automatically stabilize amplification by the external optical resonator under oscillation of the optical resonator in the self-oscillation amplifying optical loop-path.

* * * * *

UNITED STATES PATENT AND TRADEMARK OFFICE
CERTIFICATE OF CORRECTION

PATENT NO. : 9,769,913 B2
APPLICATION NO. : 14/764823
DATED : September 19, 2017
INVENTOR(S) : Junji Urakawa et al.

Page 1 of 1

It is certified that error appears in the above-identified patent and that said Letters Patent is hereby corrected as shown below:

In the Claims

In Column 23, Claim 1, Line 32, after "self-oscillation amplify" replace "last" with --laser--.

Signed and Sealed this
Seventh Day of August, 2018

Andrei Iancu
*Director of the United States Patent and Trademark Office*